(12) United States Patent
Okada et al.

(10) Patent No.: US 7,462,798 B2
(45) Date of Patent: Dec. 9, 2008

(54) GAMING MACHINE

(75) Inventors: Kazuo Okada, Tokyo (JP); Hirobumi Toyoda, Tokyo (JP)

(73) Assignee: Aruze Corp., Tokyo (JP)

( * ) Notice: Subject to any disclaimer, the term of this patent is extended or adjusted under 35 U.S.C. 154(b) by 35 days.

(21) Appl. No.: 11/411,160

(22) Filed: Apr. 26, 2006

(65) Prior Publication Data

US 2006/0254888 A1 Nov. 16, 2006

(30) Foreign Application Priority Data

Apr. 27, 2005 (JP) ............................. 2005-130149
Apr. 27, 2005 (JP) ............................. 2005-130150

(51) Int. Cl.
*H03K 17/975* (2006.01)

(52) U.S. Cl. ...................... 200/600; 200/5 A
(58) Field of Classification Search ............... 200/5 A, 200/2 R, 2 E, 310–314
See application file for complete search history.

(56) References Cited

U.S. PATENT DOCUMENTS

| | | | | |
|---|---|---|---|---|
| 5,364,271 | A * | 11/1994 | Aknin et al. .................. 434/61 |
| 6,329,620 | B1 * | 12/2001 | Oishi et al. ................. 200/86.5 |
| 7,173,628 | B1 * | 2/2007 | Kawai .......................... 345/531 |
| 2005/0247550 | A1 * | 11/2005 | Hamada ...................... 200/293 |
| 2007/0029183 | A1 * | 2/2007 | Hsu et al. .................... 200/520 |
| 2007/0041095 | A1 * | 2/2007 | Nakaya et al. .............. 359/463 |
| 2007/0066380 | A1 * | 3/2007 | Miura .......................... 463/16 |
| 2007/0094611 | A1 * | 4/2007 | Sasaki ......................... 715/804 |
| 2007/0097245 | A1 * | 5/2007 | Battles et al. ........... 348/333.01 |
| 2007/0103565 | A1 * | 5/2007 | Xu et al. .................. 348/231.2 |
| 2007/0155497 | A1 * | 7/2007 | Okada .......................... 463/36 |
| 2007/0168425 | A1 * | 7/2007 | Morotomi .................... 709/204 |
| 2007/0197277 | A1 * | 8/2007 | Sato ............................. 463/16 |
| 2007/0218989 | A1 * | 9/2007 | Okada .......................... 463/31 |
| 2007/0225054 | A1 * | 9/2007 | Okamoto et al. .............. 463/3 |
| 2007/0262965 | A1 * | 11/2007 | Hirai et al. .................. 345/173 |

FOREIGN PATENT DOCUMENTS

| | | | | |
|---|---|---|---|---|
| EP | 1 363 253 | A2 | 11/2003 | |
| GB | 2147817 | A | 5/1985 | |
| GB | 2351547 | A | 3/2001 | |
| JP | 405342936 | * | 12/1993 | .............. 200/302.1 |
| JP | 406231650 | * | 8/1994 | ................. 200/329 |
| JP | 2004-73682 | | 3/2004 | |
| JP | 2004-208894 | | 7/2004 | |
| JP | 2004-298576 | | 10/2004 | |
| RU | 2 237 924 | C1 | 10/2004 | |
| WO | WO 00/16186 | | 3/2000 | |

OTHER PUBLICATIONS

Macao Search Report/Office Action dated May 2, 2008 with an English translation.
European Search Report dated Aug. 1, 2006.

* cited by examiner

*Primary Examiner*—Michael A Friedhofer
*Assistant Examiner*—Lisa N Klaus
(74) *Attorney, Agent, or Firm*—McGinn IP Law Group, PLLC

(57) ABSTRACT

A gaming machine having a display that displays a determined screen including a character, during execution of a game, a touch panel sensor, disposed above the display, that is capable of detecting the contact position, the position of the character contacted by a player, and a CPU that determines the contact position of the character as well as the contact mode, and that displays an image on the display, that is changed based on the result of this determination.

10 Claims, 27 Drawing Sheets

FIG. 24A

| IMAGE DISPLAY INSTRUCTION | REGION TABLE | PERFORMANCE PATTERN TABLE |
|---|---|---|
| FIRST IMAGE DISPLAY INSTRUCTION | FIRST REGION TABLE | FIRST PERFORMANCE PATTERN TABLE |
| SECOND IMAGE DISPLAY INSTRUCTION | SECOND REGION TABLE | SECOND PERFORMANCE PATTERN TABLE |
| THIRD IMAGE DISPLAY INSTRUCTION | THIRD REGION TABLE | THIRD PERFORMANCE PATTERN TABLE |
| ... | ... | ... |

FIG. 24B

FIRST REGION TABLE

| REGION 1 | (x1, y1) (x2, y2) | FIRST CONTACT MODE |
| --- | --- | --- |
| | | SECOND CONTACT MODE |
| | | THIRD CONTACT MODE |
| | | ... |
| REGION 2 | (x3, y3) (x4, y4) | |

FIG. 24C

FIRST PERFORMANCE PATTERN TABLE

| FIRST PERFORMANCE PATTERN TABLE | |
|---|---|
| FIRST CONTACT MODE | PERFORMANCE PATTERN CODE 1 |
| SECOND CONTACT MODE | PERFORMANCE PATTERN CODE 2 |
| THIRD CONTACT MODE | PERFORMANCE PATTERN CODE 3 |
| ... | ... |

GAMING MACHINE

CROSS REFERENCE TO RELATED APPLICATIONS

This application is based upon and claims the benefit of priority from the Japanese Patent Applications No. 2005-130149 filed on Apr. 27, 2005 and No. 2005-130150 filed on Apr. 27, 2005 in the Japanese Patent Office; the entire contents of which are incorporated herein by reference.

BACKGROUND OF THE INVENTION

1. Field of the Invention

The present invention relates to a gaming machine and more specifically, to a gaming machine in which the display mode of a character displayed on a gaming screen or demo screen changes in response to a player making contact with the character.

2. Description of the Related Art

In recent years gaming machines installed in game halls or store have been mainly machines that respond to input from a touch panel. A touch panel responsive gaming machine could be like the following.

(1). A gaming machine such as that disclosed in Japanese Unexamined Patent Application Publication No. 2004-208894, in which a player operates a controller to define an instruction input region in a part of the character, such as the head or shoulders, displayed on the screen and coordinates movement control processes of the character with the instruction input region, thereby specifying the instruction input region. After this specification operation, the movements of the player character are controlled via a contact screen such that the hands or other parts of the player character as if corresponding to the alter ego of the player, contact the part of the character thus specified. When the part contacted by the player character is the part defined as the instruction input region the corresponding action control process is executed on the process execution screen and the player character performs the instructed action.

(2). A gaming system such as that disclosed in Japanese Unexamined Patent Application Publication No. 2004-73682 in which a plurality of action icons for facilitating selection of the action performed by a player character are displayed on a touch panel type display part, and a plurality of other player character images are displayed, the input selection for actions and the input selection for targets being performed via touch input to action icons and touch input to other player characters.

Conventional touch panel responsive gaming machines also include gaming machines in which a character is displayed during the game and by touching this character image control is performed such that the character appears to move toward the player. The responses of the character when the touch panel is touched are uniform however, and it is only possible for a player to continually repeat touching the touch panel deriving the same response from the character, which may cause the player to become bored.

Moreover, while conventional gaming machines employ performance scenes that make a character perform a variety of actions during a game, normally, a player is only able to watch these various performance scenes on the screen and is not able to participate, therefore inviting a feeling of insufficiency.

Further, in the case of a conventional touch panel responsive gaming machine, even though the gaming machine may be displayed as touch panel responsive the only way for a player to really find out if the game is in fact touch panel responsive is to actually use the gaming machine. For a player who is using the machine for the first time it may be difficult to decide whether the machine really is touch panel responsive before actually starting the game.

Again, a player who has not used a touch panel game and who does not know how to operate the touch panel becomes confused not knowing how to operate once the game starts as they suddenly start using the touch panel. Sometimes players just stop using the game.

SUMMARY OF THE INVENTION

According to a first aspect of the present invention a gaming machine is provided having image display means (e.g. a display) for displaying a determined image including a character image while a game is being played, contact detection means (e.g. a touch panel sensor) disposed above the image display means, capable of detecting the contact position by a player, and character image changing means (e.g. a main CPU or contact region determining part and performance data selection part) for determining the contacted part of a character and the contact mode, based on the contact position and time of contact, and displaying a changed character image based on the results thus determined, on the image display means.

With this gaming machine, if it is determined for example that a first contact region has been contacted in a first contact mode the character image is made to change, however if it is determined that the first contact region has been contacted in a mode other than the first contact mode, the character image is not made to change.

In this gaming machine, a performance can be changed by contacting a character displayed on a game screen thereby running a game that brings a stronger sense of participation in the game by a player.

The contact mode is determined based on at least one from amongst contact time, contact frequency, contact interval and the trajectory traced by the contact point.

The contact time means the time from the time of commencement of contact at a first position until the time of completion of contact to that first position. Contact frequency means the number of times contact is made within a determined time frame at a determined position. The contact interval means the interval between the time of a first contact at a first position and the time of a second contact at that first position. The trajectory traced by the contact point means the positional relationship between the position of a first contact at a first contact time and the position of a second contact at a second contact time.

The character image changing means may display the image of a character changed based on different performance patterns for each contact part and contact mode, on the image display means. For example, when a first contact mode is executed in respect of a first contact part, a character image is changed based on a first performance pattern, and when a second contact mode is executed in respect of a first contact part the character image is changed based on a second performance pattern.

With this gaming machine, it is possible to change the display of a variety of characters in response to the method of contact of the player (the contact position and contact time corresponding thereto), thereby providing a game that keeps a player interested.

According to a second aspect of the present invention a gaming machine that requires insertion of game value as the price for a game is provided having, image display means for displaying a determined image including a character image before a game commences, contact detection means disposed above the image display means, capable of detecting the contact position by a player, insertion determining means for determining whether or not game value has been inserted and character image changing means for determining the contacted part coordinated to the contact position, when the insertion determining means determines that game value has been inserted, and displaying the character image changed based on the results thus determined on the image display means.

With this gaming machine, if it is determined that a first contact part has been touched the image of the character is changed, however if it is determined that the second contact part has been touched the image of the character is not changed.

According to the second aspect of the present invention, if the insertion determination means determines that game value has been inserted, a player is able to operate the touch panel before actually playing the game, enabling a player who has not played a game operated by a touch panel before to play in a more relaxed way once the actual game gets started.

It is suitable for the character image changing means to display on the image display means, a character image changed based on performance patterns that differ for each contact part.

If for example it is determined that the first contact part has been touched, the image display means displays a character image changed based on a first performance pattern, while if it is determined that the second contact part has been touched a character image changed based on a second performance pattern is displayed by the image display means.

BRIEF DESCRIPTION OF THE DRAWINGS

FIG. 24A shows an example of the relationship of correspondence between an image display instruction, a region table and a performance pattern table;

FIG. 24B shows an example of a first region table;

FIG. 24C shows an example of a first performance pattern table;

DETAILED DESCRIPTION OF THE INVENTION

Figure 1:
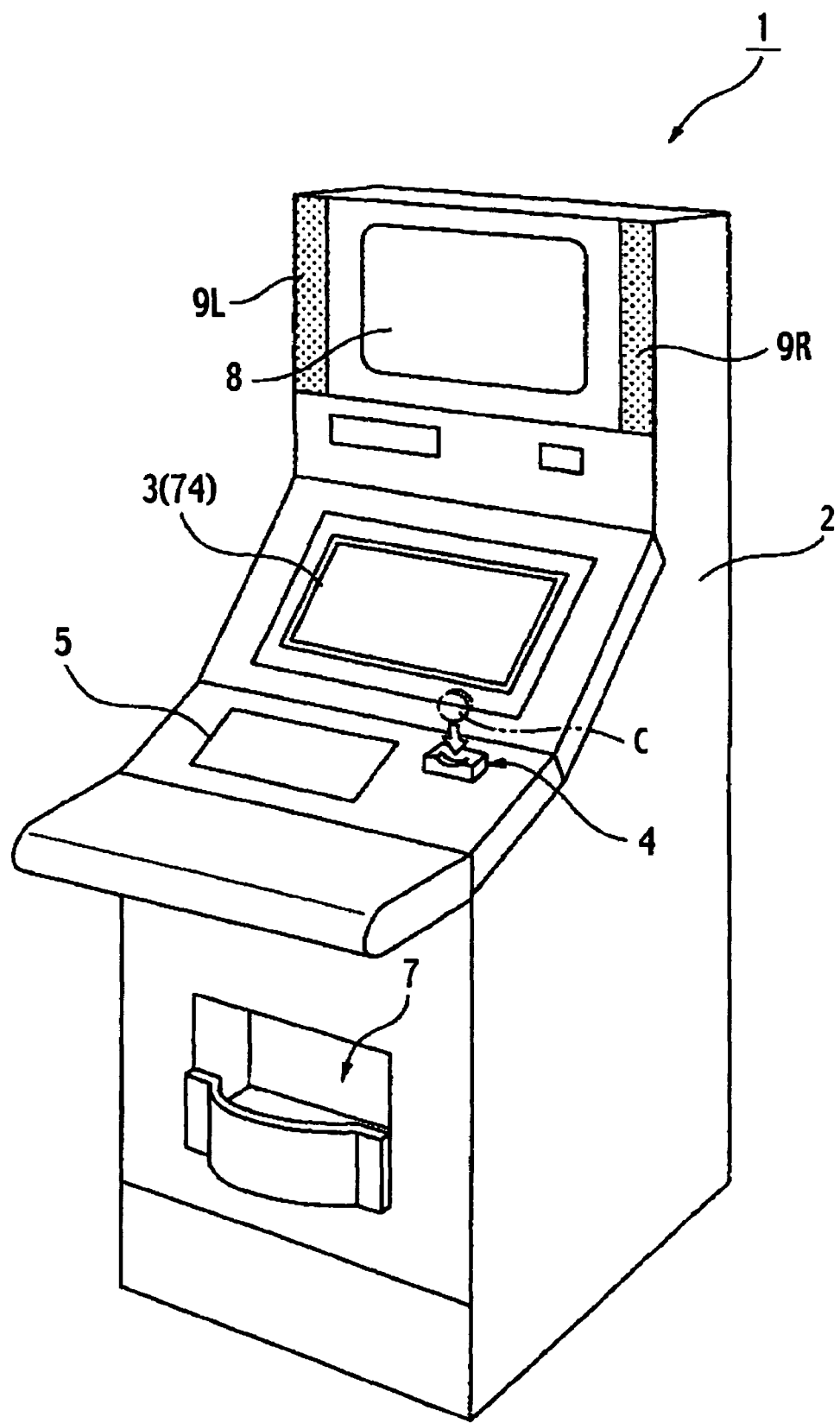
FIG. 1 is an external, perspective view of a gaming machine common to both the first and second embodiments of the present invention.

The best mode for performing the gaming machine related to the present invention will now be described with reference to the drawings. In these drawings, like reference numerals identify like elements and the following description omits providing a redundant description of like elements.

FIRST EMBODIMENT

1. External Configuration of the Gaming Machine

FIG. 1 is an external, perspective view of a gaming machine of the first embodiment of the present invention. The gaming machine 1 has a cabinet 2 and a display 3 is disposed in this cabinet 2. The display 3 is for example, a liquid crystal display panel for displaying a gaming screen.

Further, a touch panel sensor 74 is disposed on the surface of the display 3. A character or soft button displayed on the display 3 is touched by a player. This touch is recognized to provide input from the user.

Just below the display 3 a coin input slot 4 that accepts input of coins, medals, tokens or chips that comprise a medium of payment for a game (hereinafter all of which are jointly referred to as "coins") is provided. What is known as a "bill validation unit" for accepting input of notes may also be installed in the cabinet 2 as appropriate.

Figure 2:
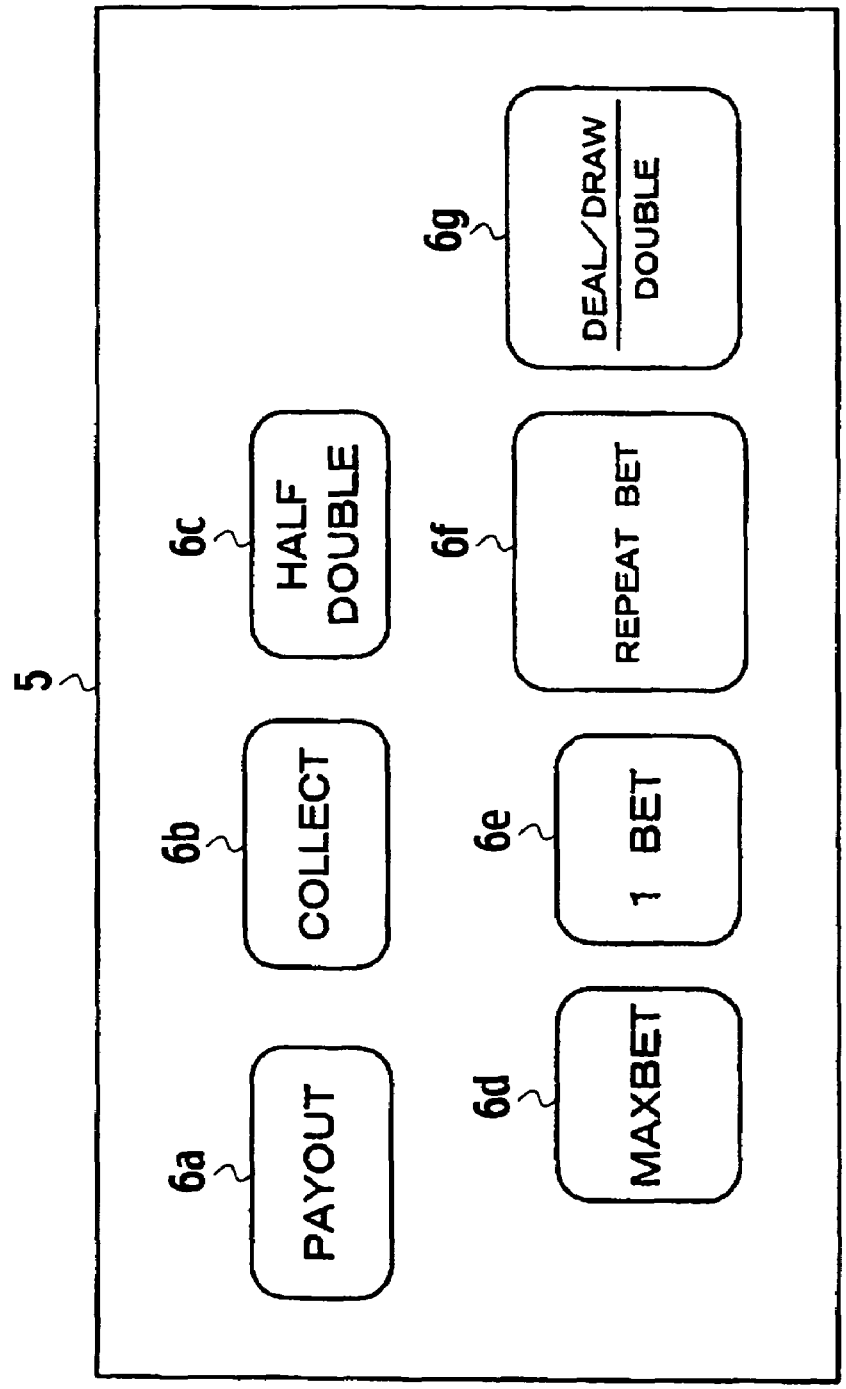
FIG. 2 is an enlarged view of the control panel used for both the first and second embodiments of the present invention.

A control panel 5 that provides a means by which the player can perform input is disposed below the display 3. This control panel 5 is largely the same as those installed in well-known games and provides a means by which a player can input instructions to the gaming machine 1. In the case of this embodiment the control panel provides seven buttons 6a-6g as shown in FIG. 2.

That is to say, the control panel 5 provides a payout button 6a that enables the gaming machine 1 to payout coins acquired by a player; a collect button 6b for instructing the gaming machine 1 to proceed to the next stage after a stage has been completed; a half double button 6c for instructing execution of the help function; a max bet button 6d, for using the maximum value allowed from the number of coins credited by the gaming machine 1 for a bet; a 1 bet button 6e for using a single bet from the number of coins credited by the gaming machine 1; a repeat bet button 6f for using the same number of coins for a bet as the number used in the previous bet from the number of coins credited by the gaming machine 1; and a deal/draw button 6g for starting a game on the gaming machine 1 after the bet is finished.

The description of the external configuration of the gaming machine 1 continues referring again to FIG. 1.

A sub display 8 for consecutively displaying information and images, (such as a repayment table, a dice throwing table as described subsequently and a game content description table and the like) that do not directly impact on the game, is provided above the cabinet 2. Further, a pair of speakers 9L and 9R that play music and voice are provided one on either side of the sub display 8.

A coin receiving part from which a player can retrieve coins paid out by the gaming machine 1 is disposed at the bottom part of the cabinet 2.

2. Internal Configuration of the Gaming Machine

Figure 3:
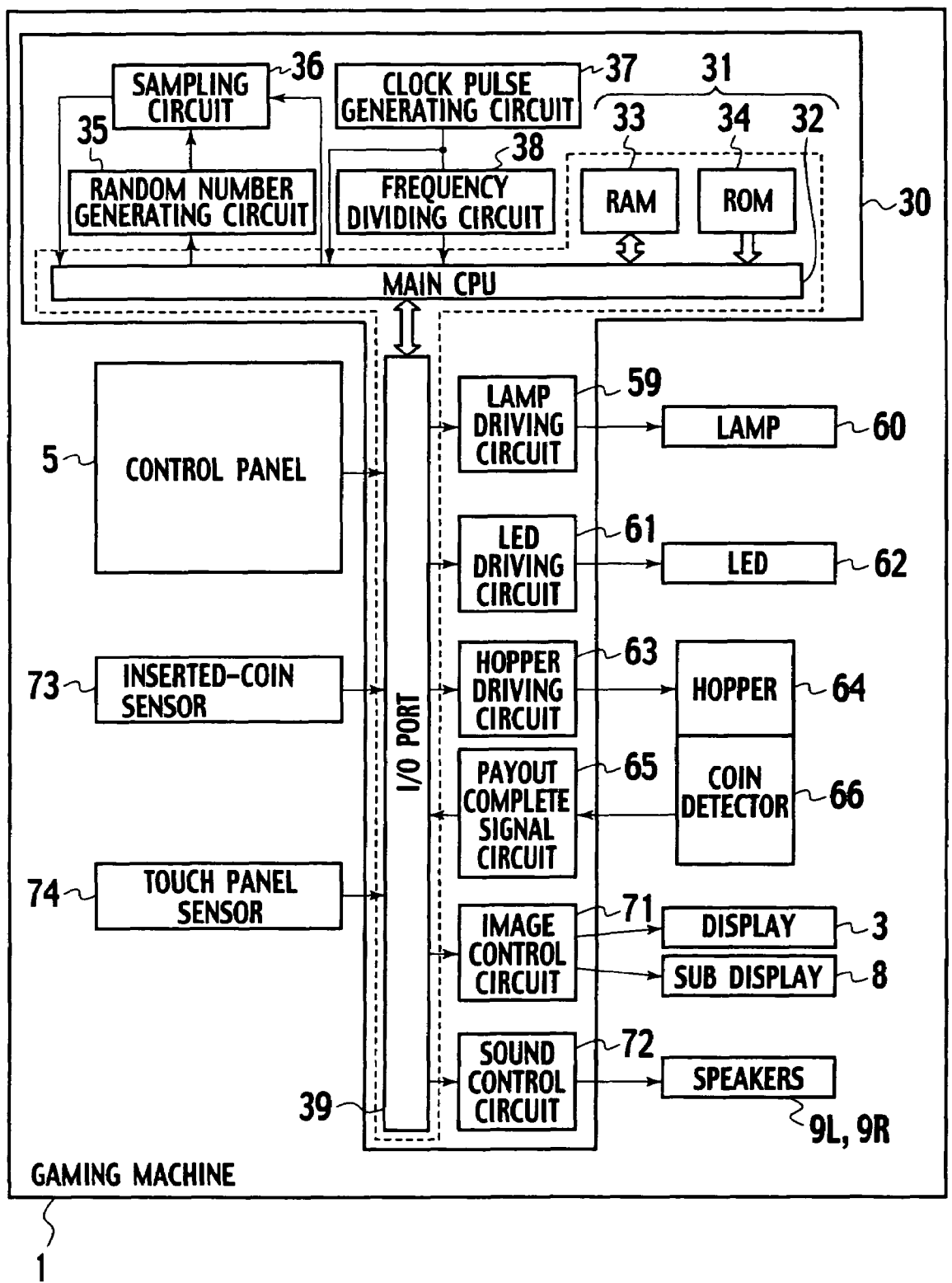
FIG. 3 is a block diagram showing the configuration of the electrical components of a gaming machine used for both the first and second embodiments of the present invention.

FIG. 3 is a block diagram showing the internal configuration of gaming machine 1. As shown in FIG. 3, the gaming machine 1 comprises a gaming machine substrate 30 inside the cabinet 2 and peripheral devices connected to the gaming machine substrate. A plurality of circuits, chiefly a microcomputer 31, are mounted on the substrate 30.

The microcomputer 31 comprises a main Central Processing Unit (CPU) 32, Random Access Memory (RAM) 33 and Read Only Memory (ROM) 34.

The CPU 32 functions in compliance with a program stored in the ROM 34, receiving signals from each part of the control panel 5 via an I/O port 39 on the one hand, whilst also controlling input and output of signals between other structural elements, thereby providing overall operational control of the gaming machine 1. The RAM 33 stores a program and data used when the CPU 32 functions, and for example, stores temporarily after a game commences, a random value sampled by a sampling circuit 36, described subsequently. Further, contact position data is stored in the RAM 33. The ROM 34 stores permanent data such as programs executed by the CPU 32, region tables 407 and performance pattern tables 408 and the like.

A random number generating circuit 35, the sampling circuit 36, a clock pulse generating circuit 37 and frequency dividing circuit 38 are connected to the CPU 32.

The random number generating circuit 35 functions in compliance with instructions from the CPU 32 generating random numbers within a determined range. The sampling circuit 36 extracts random numbers from among those generated by the random number generating circuit 35, in compliance with instructions from the CPU 32, and inputs the random numbers thus extracted to the CPU 32. The clock pulse generating circuit 37 generates the standard clock used by the CPU 32, while the frequency dividing circuit 38 inputs signals divided at uniform cycles of the standard clock.

A lamp driving circuit 59, LED driving circuit 61, hopper driving circuit 63, payout complete signal circuit 65, image control circuit 71, and a sound control circuit 72 are mounted on the substrate 30, these circuits being connected to the CPU 32 via the I/O port 39.

The gaming machine 1 provides the image control circuit 71 that performs process control for images displayed on the sub display 8 and the display 3 and provides the sound control circuit 72 that performs control of sounds generated from the speakers 9L and 9R.

The lamp driving circuit 59 outputs a signal to the lamp 60 that makes the lamp 60 flash, thereby making it flash or stop flashing during performance of a game. The performance of a game takes place in accordance with the flashing or stoppage of this lamp 60. The LED driving circuit 61 controls the switching on and off of the LED 62. The hopper driving circuit 63 drives the hopper 64 in accordance with control from the CPU 32, as the hopper 64 operates to perform the payout of coins representing game value. These coins are deposited in a coin receptor part 7. Thus the hopper 64 is a device for facilitating payout of coins to a player.

The payout complete signal circuit 65 is connected to the coin detection part 66. The coin detection part 66 measures the number of coins paid out by the hopper 64 and notifies the data on the value for this measured number of coins to the payout complete signal circuit 65. The payout complete signal circuit 65 counts the value for the number of coins from the coin detection part 66 and when the value for that number of coins reaches a set number of coins as determined in the data, outputs a signal notifying that payment of coins is now complete to the CPU 32.

The image control circuit 71 controls image display occurring on the display 3 and the sub display 8 and displays various kinds of images such as pattern images and the like described subsequently, on the display 3 and the sub display 8.

The image control circuit 71 comprises an image control CPU, work RAM, program ROM, image ROM, video RAM and Video Display Processor (VDP). The image control CPU determines images (pattern images etc.) displayed on the display 3 and the sub display 8 in compliance with an image control program stored in the program ROM in advance, based on parameters set by the microcomputer 31. The work RAM is constructed to provide a temporary storage means that operates when the image control CPU runs the image control program.

The program ROM stores the image control program and the various selection tables. The image ROM stores image data such as dot data and the like for forming character images and background images. The video RAM is constructed as a temporary storage means that operates when images are formed by the VDP. The VDP provides control RAM, and generates image signals coordinated to the display content of the display 3 and the sub display 8 determined by the image control CPU, and outputs each of the image signals generated to the display 3 and the sub display 8. The sound control circuit 72 controls sounds such as music and audio effects, generated from the speakers 9L and 9R based on instructions from the main CPU 32.

Further, the control panel 5 and the touch panel sensor 74 are connected to the microcomputer 31 as well as the inserted-coin sensor 73 that detects when a coin has been input from the coin input slot 4 and outputs a detection signal to the microcomputer 31. The microcomputer 31 operates in response to this detection signal, adding a value corresponding to the number of coins input to the credit value equivalent to the number of coins held inside the gaming machine 1 for the player.

3. Functioning of the Gaming Machine

The functioning of the gaming machine 1 related to this embodiment is realized by the execution of a program stored in the ROM 34, by the microcomputer 31, or more specifically, the CPU 32. The functions realized when this program is run by the microcomputer 31, or more specifically, the CPU 32, will now be described.

Figure 4:
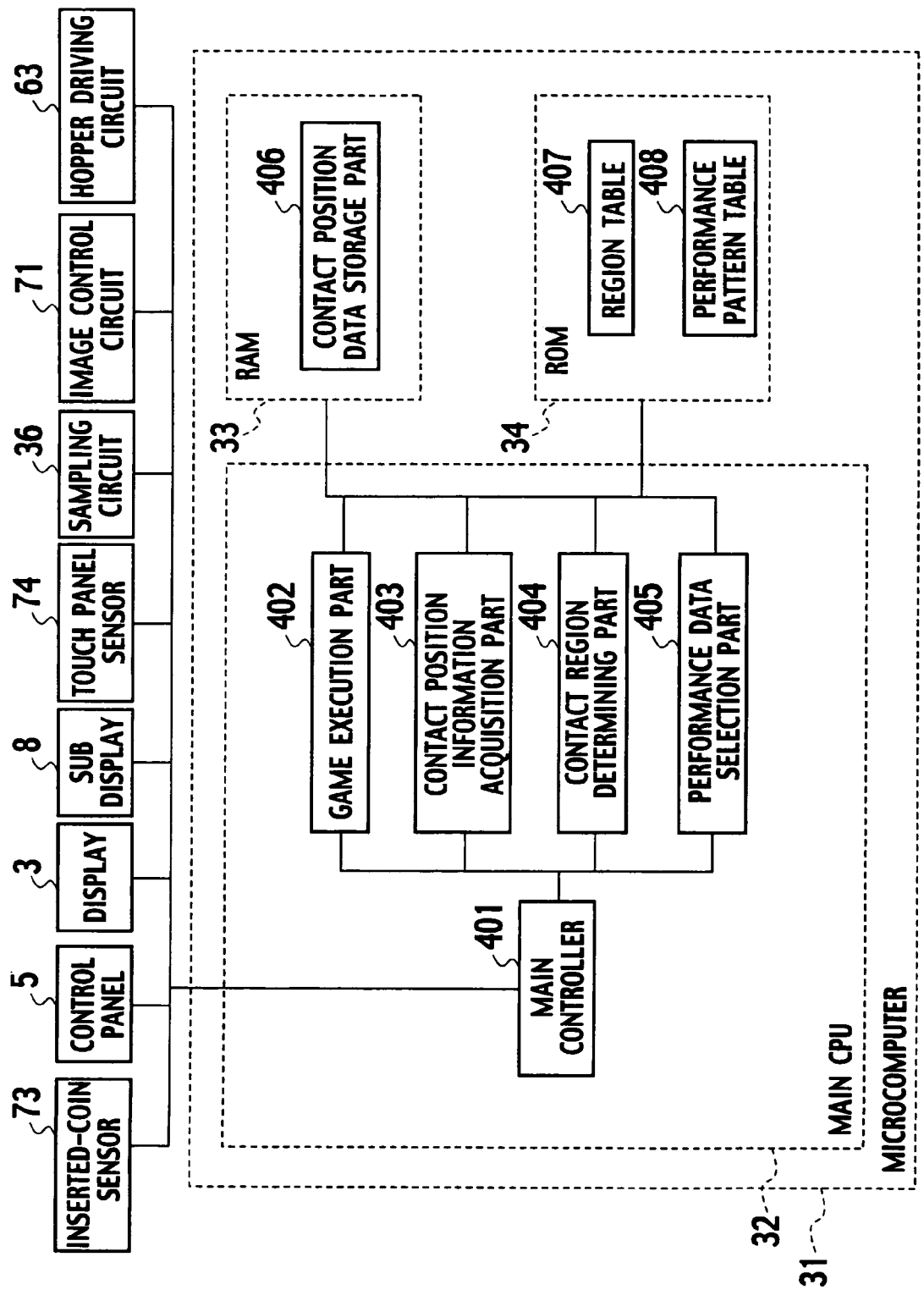
FIG. 4 is a block diagram showing the functions of the main CPU and peripheral devices of the first embodiment.

FIG. 4 is a block diagram showing the functioning of the gaming machine 1. In the example shown in FIG. 4, the CPU 32 functions as a main control part 401, a game execution part 402 that receives data from this main control part 401, a contact position information acquisition part 403, a contact region determining part 404 and a performance data selection part 405.

3.1 The Main Control Part

The main control part 401 performs overall control of the operations of each of the circuits and each of the parts of the gaming machine 1. More specifically, the main control part 401 receives each of the input signals from the inserted-coin sensor 73, the control panel 5 and the touch panel sensor 74 and issues instructions to each part in response to the signals thus received, to start performing the required processes. Further, the main control part 401 acquires a random number value from the sampling circuit 36 in accordance with the request issued from each part and passes that random number value to the appropriate part.

Further, the main control part 401 sends image generation instructions to the image control circuit 71 in order to display images corresponding to the operation of each part on the display 3 and the sub display 8. Moreover, the main control part 401 causes the payout of coins by sending a coin payout instruction to the hopper driving circuit 63, under determined conditions, when a player pushes the payout button 6a. Again, in order to initiate the performance corresponding to the operation of each part as appropriate, the main control part 401 sends an operate instruction to the lamp driving circuit 59, the LED driving circuit 61 and the sound control circuit 72 (not shown in FIG. 4), thereby executing the performance as required from the lamp 60, the LED 62 and the speakers 9L and 9R.

The respective functions of the game execution part 402, the contact position information acquisition part 403, the contact region determining part 404 and the performance data selection part 405 each controlled by the main control part 401 will now be described.

3.2 The Game Execution Part

The game execution part 402 has the function of running the main game of the gaming machine 1. The game execution part 402 is started up by the main control part 401 when a player performs input instructing commencement of a game.

The game execution part 402 then runs a game program housed in the ROM 34 in advance allowing the player to perform the game.

Further, the game execution part 402 sends an image display instruction to the image control circuit 71 in order to display the continually changing game screens that change as the game progresses, on the display 3. In response to this instruction, the image circuit 71 then uses a background image or stripes or the like housed in the image ROM, generates image data and displays an image based on the image data on the display 3.

3.3 The Contact Position Information Acquisition Part

The contact position information acquisition part 403 functions as a contact detection means in tandem with the touch panel sensor 74. The touch panel sensor 74 outputs contact position data showing the coordinates on the touch panel sensor 74 touched by a player to the RAM 33. The contact position information acquisition part 403 (1) determines whether or not there is contact position data in the contact position data storage part 406 by investigating the contact position data storage part 406, that is a determined storage region of the RAM 33, and (2) passes this contact position data to the contact region determining part 404 when contact position data does exist in the contact position data storage part 406. When there is no contact position data existing in the contact position data storage part 406, the contact position information acquisition part 403 notifies that to the main control part 401. Further, contact position data is output regularly (e.g. at 0.1 second intervals) and this data is stored consecutively, enabling the trajectory of movement of the contact position of a player, the movement speed and the contact time and the like to be ascertained.

3.4 The Contact Region Determining Part

The contact region determining part 404 determines which part of a character displayed on the display 3 is touched by a player, based on contact position data passed from the contact position information acquisition part 403. The method by which the contact region determining part 404 makes this determination may operate for example, using a region table 407 prepared in advance and housed inside the ROM 34, that contains data prescribing regions corresponding to each part of a character, such as the head region, the thoracic region, the legs etc., and making a determination as to which region the contact region is in from the contact position data passed from the contact position information acquisition part 403. When the region is a rectangle, the data prescribing the region are two coordinates data, for example (x1, y1) showing the upper left corner of the rectangle and (x2, y2) showing the lower right corner of the same rectangle. When the region is a quadrangle, which is not a rectangle, the data prescribing the region are four coordinates data showing four vertices. Further, when the region is a round shape, the data prescribing the region comprises a center coordinate and radius of the circle.

A plurality of region tables 407 is prepared corresponding to image display instructions. For example, as shown in FIG. 24A, a first region table corresponds to a first image display instruction, a second region table corresponds to a second image display instruction and a third region table corresponds to a third image display instruction. The contact region determining part 404 receives images display instructions output from the game execution part 402 and selects the region table 407 corresponding to the instruction. In this way, the performance occurring when a character is touched can be run on any of the game screens.

Further, the contact region determining part 404 determines how a player has touched a character image (the "contact mode"), based on contact position data passed from the contact position information acquisition part 403 and [the time acquired by that contact position data], and outputs this determination. By determining how a player has touched a character image it is possible to infer the intentions, mood and feelings and the like of the player, and if the performance of the game is conducted based on this, it becomes possible to provide a performance that is more appealing to the player.

The contact mode is a concept that includes elements such as the length of contact time, the trajectory drawn by the contact points and the speed of movement to/between the contact points. The contact region determining part 404 determines the contact mode from the contact position data and outputs the result of the determination. The method for making the determination involves the output of coordinates $(x1, y1), (x2, y2), (x3, y3), \ldots$ that comprise contact position data in respect of each time point $t1, t2, t3, \ldots$ (where time proceeds in sequence of $t1, t2, t3, \ldots$). This output is stored and the trajectory of movement of the contact positions of the player is ascertained as line segments passing the coordinates. Again, it is also possible to calculate movement speed from the distance between these coordinates. Moreover, if the time interval from commencement of output of contact position data until completion is acquired, it is possible to acquire the contact time.

For example, as region 1 is a rectangle, the data prescribing region 1 is $(x1, y1)$ and $(x2, y2)$, as region 2 is also a rectangle, the data prescribing region 2 is $(x1, y2)$, and $(x2, y3)$, as region 3 is also a rectangle, the data prescribing region 3 is $(x2, y2)$ and $(x3, y3)$, and as region 4 is also a rectangle, the data prescribing region 4 is $(x2, y1)$ and $(x3, y2)$, the coordinates showing contact position for time t1 are $(xt1, yt1)$, the coordinates showing contact position for time t2 are $(xt2, yt2)$, the coordinates showing contact position for time t3 are $(xt3, yt3)$, and the coordinates showing contact position for time t4 are $(xt4, yt4)$, and $x1 < x2$ and $y1 < y2$.

Moreover, if x1 less than or equal to xt1, xt1 less than x2 and y1 less than or equal to yt1, yt1 less than y2, it is determined that region 1 has been touched at time t1.

Further, if x1 less than or equal to xt1, xt1 less than x2, and y1 less than or equal to yt1, yt1 less than y2, x1 less than or equal to xt2, xt2 less than x2, and y1 less than or equal to yt2, yt2 less than y2, x1 less than or equal to xt3, xt3 less than x2, and y1 less than or equal to yt3, yt3 less than y2, x1 less than or equal to xt4, xt4 less than x2, and y1 less than or equal to yt4, yt4 less than y2, it is determined that region 1 has been continually contacted or contacted four times during the interval of from time t1 to time t4.

Again, if x1 less than or equal to xt1, xt1 less than x2 and y1 less than or equal to yt1, yt1 less than y2, x1 less than or equal to xt2, xt2 less than x2 and y2 less than or equal to yt2, yt2 less than y3, x2 less than or equal to xt2, xt2 less than x3 and y2 less than or equal to yt3, yt3 less than y3, x2 less than or equal to xt4, xt4 less than x3 and y1 less than or equal to yt4, yt4 less than y2, region 1 is determined to have contacted at time t1, region 2 is determined to have contacted at time t2, region 3 is determined to have contacted at time t3 and region 4 is determined to have contacted at time t4.

The contact region determining part 404 performs the above described determinations and passes the results to the performance data selection part 405.

3.5 The Performance Data Selection Part

The performance data selection part 405 receives the determination results from the contact region determining part 404 and determines the performance data in response to the results. The performance data selection part 405 has a function to make the image control circuit 71 perform an image display coordinated to this performance data. Determination of performance data is performed for example by providing performance pattern tables 408 in the ROM 34 in advance. Each performance pattern table 408 is a table containing performance pattern data coordinated to each region such as the head region, the thoracic region and the leg region and the like, and/or the contact mode.

For example, if the duration of contact to the head region is not more than 0.5 seconds, first performance pattern data is applied, if the duration of contact to the head region is not less than 0.5 seconds, second performance pattern data is applied.

Further, the head region is determined by $(x1, y1)$ and $(x2, y2)$, coordinates $(xt1, yt1)$ show the contact position for time t1, coordinates $(xt2, yt2)$ show the contact position for time t2, coordinates $(xt3, yt3)$ show the contact position for time t3, coordinates $(xt4, yt4)$ show the contact position for time t4, and $x1 < x2$ and $y1 < y2$.

If, x1 less than or equal to xt1, xt1 less than (x2)/2 and y1 less than or equal to yt1, yt1 less than (y2)/2, x1 less than or equal to xt2, xt2 less than (x2)/2 and (y2)/2 less than or equal to yt2, yt2 less than y2, (x2)/2 less than or equal to xt3, xt3 less than x2 and (y2)/2 less than or equal to yt3, yt3 less than y2, (x2)/2 less than or equal to xt4, xt4 less than x2 and y1 less than or equal to yt4, yt4 less than (y2)/2, the third performance pattern is applied.

The performance patterns are data by which the game execution part 402 instructs the image control circuit 71 on the movements and expressions and the like of a character. There is a plurality of performance pattern tables 408 prepared, each corresponding to an image display instruction. For example, as shown in FIG. 24A, the first performance pattern table corresponds to image display instruction 1, the second performance pattern table corresponds to image display instruction 2, the third performance pattern table corresponds to image display instruction 3. The performance data selection part 405 receives an image display instruction output from the game execution part 402 and selects the performance pattern data from the performance pattern tables 408 corresponding to the instruction. In this way, the performance can be run when a character is touched on any game screen.

Further, the microcomputer 31 has ROM 34 and RAM 33 that function in tandem with the CPU 32. The RAM 33 functions as the contact position data storage part 406 described above. The description of these appears above.

The ROM 34 provides functions for the region tables 407 and the performance pattern tables 408. These tables also have been described above. This completes the description of the functions and configuration of the gaming machine 1.

4. Example of Operation of the Gaming Machine

An example of the operation of the gaming machine 1 will now be described with reference to FIGS. 5 and 6.

Figure 5:
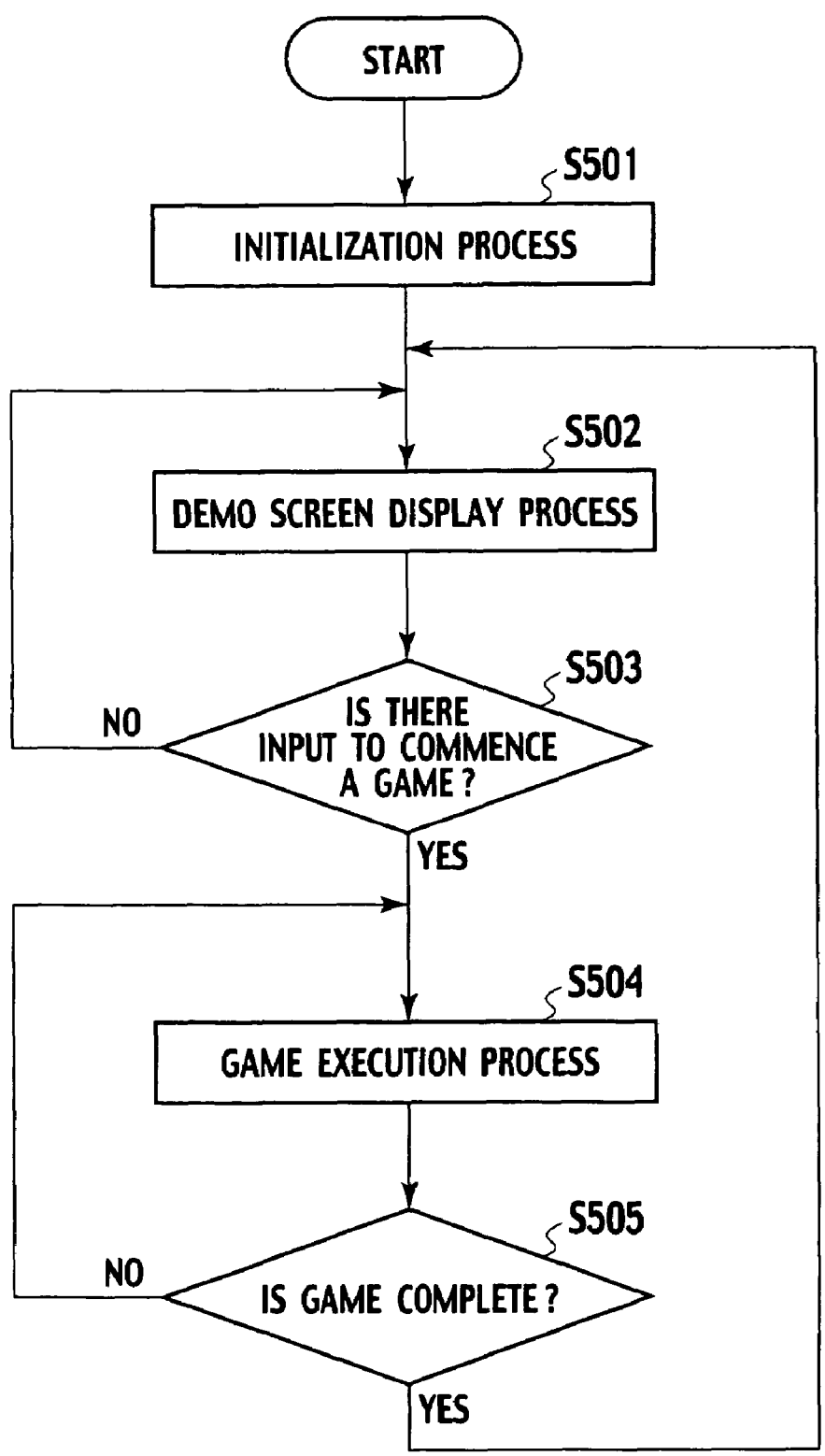
FIG. 5 is a flowchart showing an example of the main process executed by the gaming machine according to the first embodiment.

FIG. 5 is a flowchart showing an example of the main processes executed by the gaming machine according to the first embodiment.

Once power is supplied to the gaming machine 1, the CPU 32 performs initialization processes for each of the circuits such as the RAM 33 and the like (S501).

Next, the CPU 32 runs the demo screen display process (S502) issuing instructions to the image control circuit 71 to display a demo screen on the display 3. The image control circuit 71 passes image data defined as the demo screen to the display 3 and displays the demo screen image.

Thereafter, the CPU 32 determines whether or not a player has performed input to commence a game, such as pushing the start button (S503).

If the CPU 32 determines that the player has not performed input to commence a game, such as depressing the start button, the CPU 32 returns to controlling the demo screen display process (S502) and continues displaying the demo screen. If on the other hand, the CPU 32 determines that the player has performed input to commence a game, the CPU 32 performs processes to run a game (S504). The game execution process consists of processes performed by the game execution part 402, providing processes to enable the player to play the game provided by the gaming machine 1.

During the game execution processes, regular interruption processes generated at regular intervals (for example every 100 ms) are executed by the CPU 32. The regular interruption process will now be described with reference to FIG. 6. FIG. 6 is a flow chart showing an example of the regular interruption process performed during execution of game processes according to the first embodiment.

The regular interruption process is a process performed by the CPU 32 to ascertain whether or not the character displayed on the game screen has been touched by a player. If the character has been touched the process is executed to run the performance (image display) making the display mode of that character change in response to the contacted part and/or the contact mode.

Once the regular interruption process commences, the CPU 32, or more specifically, the contact position information acquisition part 403, searches the contact position data storage part 406 of the RAM 33 and determines whether or not there is contact position data in the contact position data storage part 406 that comprises output data from the display 3 (S601). If there is no contact position data it means that the player has not touched the character, thus there is no need to change the character display mode, so no additional processes are run and the regular interruption process is completed (S601, No).

At S601, if there is a determination by the CPU 32 that contact position data is present (S601, Yes), the CPU 32 performs display image specification process (S602) that runs a process to investigate what image/screen is being displayed on the display 3. Basically, this involves specifying the respective table from among the plurality of region tables 407 and performance pattern tables 408 such that the contact region determining part 404 and the performance data selection part 405 are made to select the corresponding region or performance pattern applied to the image display instruction presently being run.

For example, as shown in FIG. 24A the first region table and the first performance pattern table are applied to the first image display instruction, while the second region table and the second performance pattern table are applied to the second image display instruction, thus when the image display instruction currently being run is the first image display instruction, an instruction is issued to make the contact region determining part 404 and the performance data selection part 405 select the first region table and the first performance pattern table.

Further, as shown in FIG. 24B data prescribing a plurality of regions, such as region 1 and region 2, is contained in the first region table. As shown in FIG. 24C, performance pattern codes corresponding to a plurality of different performance modes such as performance pattern code 1 corresponding to the first contact mode and performance pattern code 2 corresponding to the second contact mode are housed in the first performance pattern table.

Next, the CPU 32 functioning as the contact region determining part 404, runs the contact region determining process (S603). This contact region determining process is a process to determine, based on the contact position data described above, which part of a character a player has touched, or, by what mode (the duration for which the contact continued, the shape of the trajectory drawn by the contact points etc.) the character was touched. This contact region determining process is a process performed by the above described contact region determining part 404.

Once the result of the determination at the contact region determining process (S603) is output, the CPU 32, functioning as the performance data selection part 405, runs the performance data selection process (S604).

This performance data selection process (S604) is a process performed by the performance data selection part 405 described above, being a process in which it is determined how to change the character display in response to a result of the determination carried out at the contact region determining process (S603). Basically, the CPU 32, functioning as the performance data selection part 405, references the performance pattern table 408 instructed at S602 and acquires the appropriate performance pattern code.

Next, the CPU 32 performs the display execution process (S605), which is a process to change the character display mode to provide the display on the display 3 in accordance with the performance content as determined at the preceding selection process step. Basically, here, the CPU 32 passes the performance pattern code required by referencing the performance pattern table 408 instructed at S602 to the image control circuit 71, and the image control circuit 71 generates the determined moving image data in accordance with this performance pattern code, displaying the changing character display mode on the display 3.

The regular interruption process is completed at this point. Once the regular interruption process has completed the CPU 32 recommences the game execution process (S504).

The description of the main processes will now be continued referring again to FIG. 5. Once the game execution process (S504) is completed, the CPU 32 determines whether or not the game has finished (S505). The completion of the game is determined as being when the credit value of the player has reached 0.

If the CPU 32 determines that the game has been completed (S505, Yes), the CPU 32 returns to controlling the demo screen display process (S502) awaiting input of coins from a player, thereafter repeating each process of step 503-step 507.

On the other hand, if the CPU 32 determines that the game has not been completed (S505, No) the CPU 32 repeats the game execution process (S504) to allow the player to play the game again. Here, it goes without saying that the game execution process involves the execution of the regular interruption processes shown in FIG. 6, S601-S605.

This completes the description of the main processes.

5. Example of Screen for the Regular Interruption Process

Figure 6:
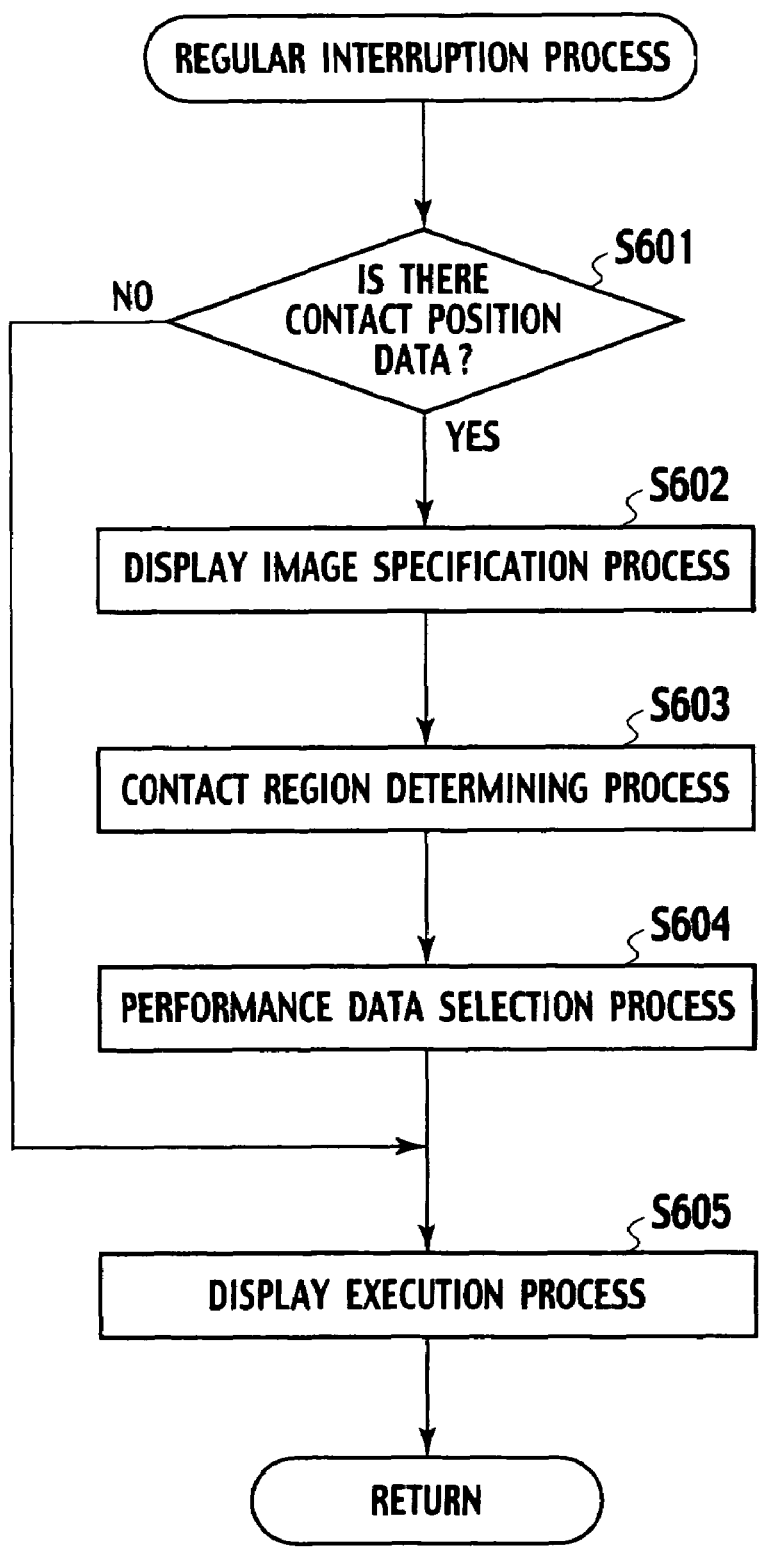
FIG. 6 is a flow chart showing an example of the regular interruption process performed during execution of game processes according to the first embodiment.

An example of a screen shown on the display 3 will now be described to provide a concrete example of the display execution process (S605) for the above described regular interruption process (FIG. 6).

Figure 7A:
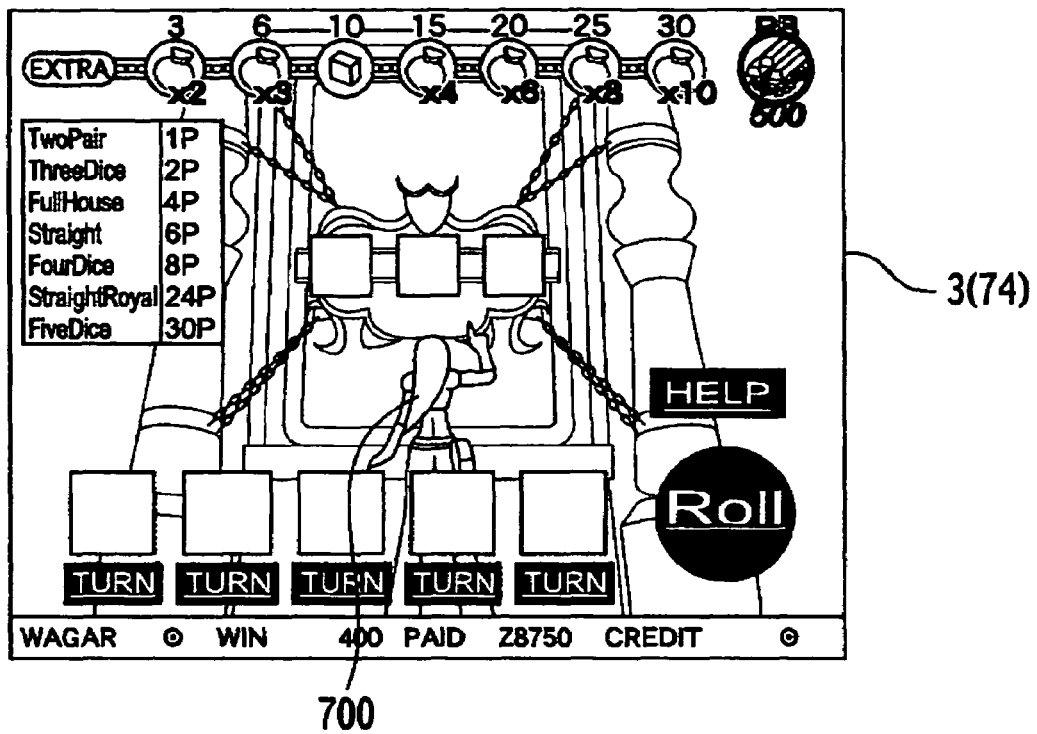
FIG. 7A shows an example of a game screen.
Figure 7B:
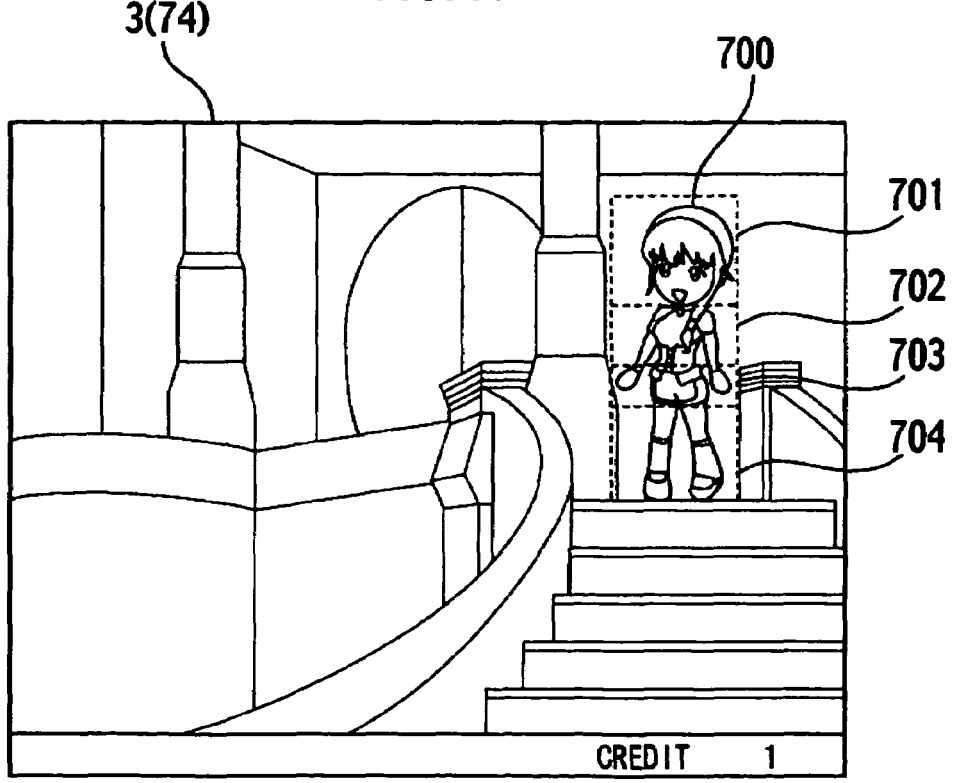
FIG. 7B shows an example of another game screen.

FIG. 7 illustrates game screens shown on the display 3 during the game execution process (S504), in which FIG. 7A shows an example of a game screen that provides an input interface urging a player to make their input and FIG. 7B shows an example of a movie screen (a screen that is not inviting the player to make input) displayed during a game. In both of these drawings, the display changes when the player touches the screen and the character 700 involved in the performance is displayed.

In the case of this embodiment, the regular interruption processes are executed during display of any screen appearing during execution of another game process, however it is also possible for the invention to provide a configuration in which the regular interruption process executes only during a specific screen display.

The following description relates to the screen shown in FIG. 7B, however the same changes of character display are also performed on the screen shown in FIG. 7A and on other screens.

As shown in FIG. 7B, head region 701 being the contact region corresponding to the head part of the character 700, thoracic region 702, being the contact region corresponding to the thoracic part of the character 700, waist region 703, being the contact region corresponding to the waist part of the character 700 and leg region 704, being the contact region corresponding to the legs part of the character 700, are defined. In FIG. 7B these different regions 701-704 are indicated by dotted framing lines in order to assist with this description, but such lines do not actually appear on the real game screen. Coordinate data of the 2 opposing vertices of each region is housed in the region tables 407.

Figure 8:
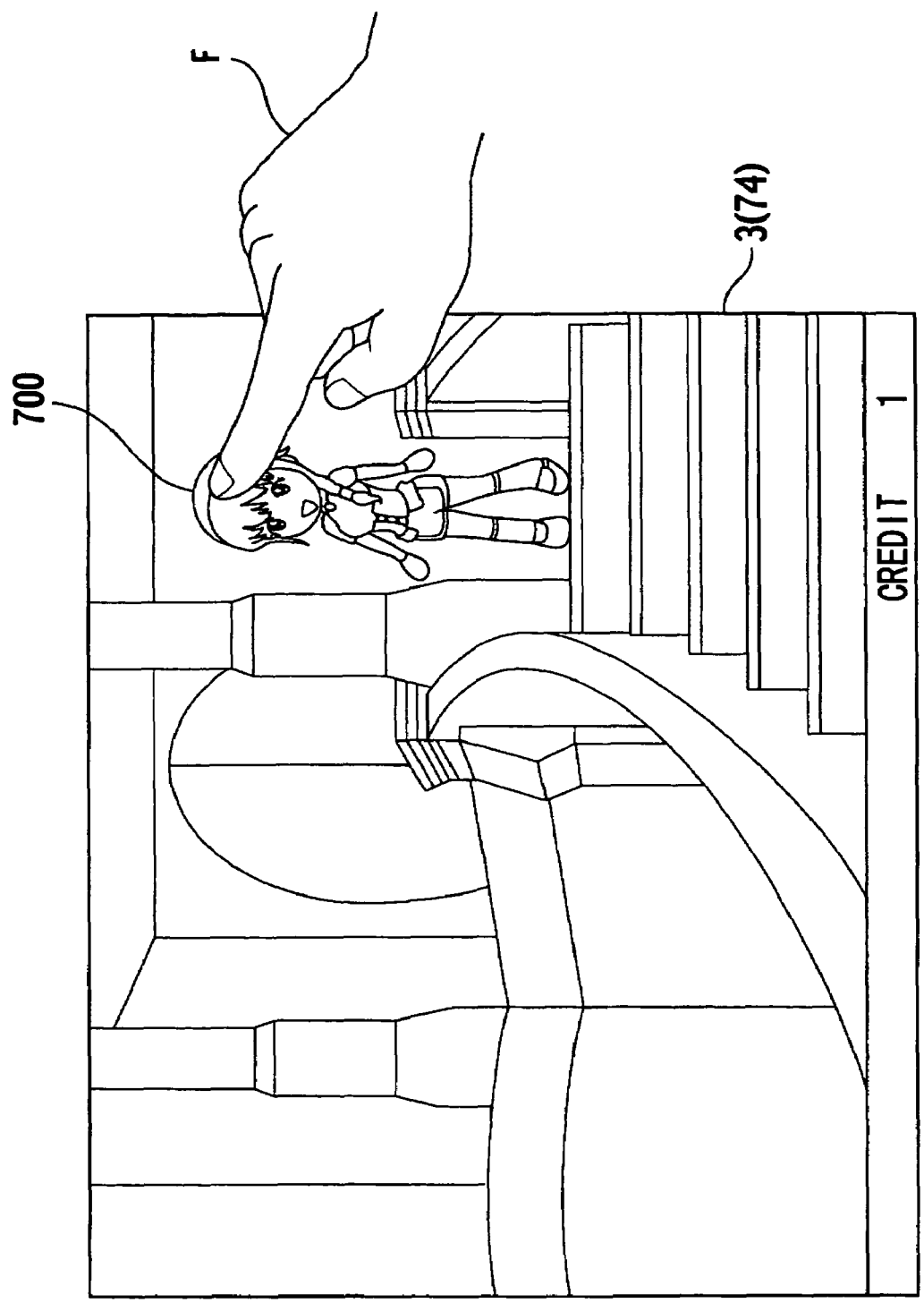
FIG. 8 shows a character in the game screen shown in FIG. 7B being touched by a player.

5.1 Example of Changes in Display Occurring Through Contact to the Head Region FIG. 8 shows the condition in which a player, using his finger F, touches the head region 701 shown in the screen displayed in FIG. 7B, between one and four times for a short time duration. After this contact has been made the screen displayed on the display 3 transitions to the screen shown in FIG. 9.

Figure 9:
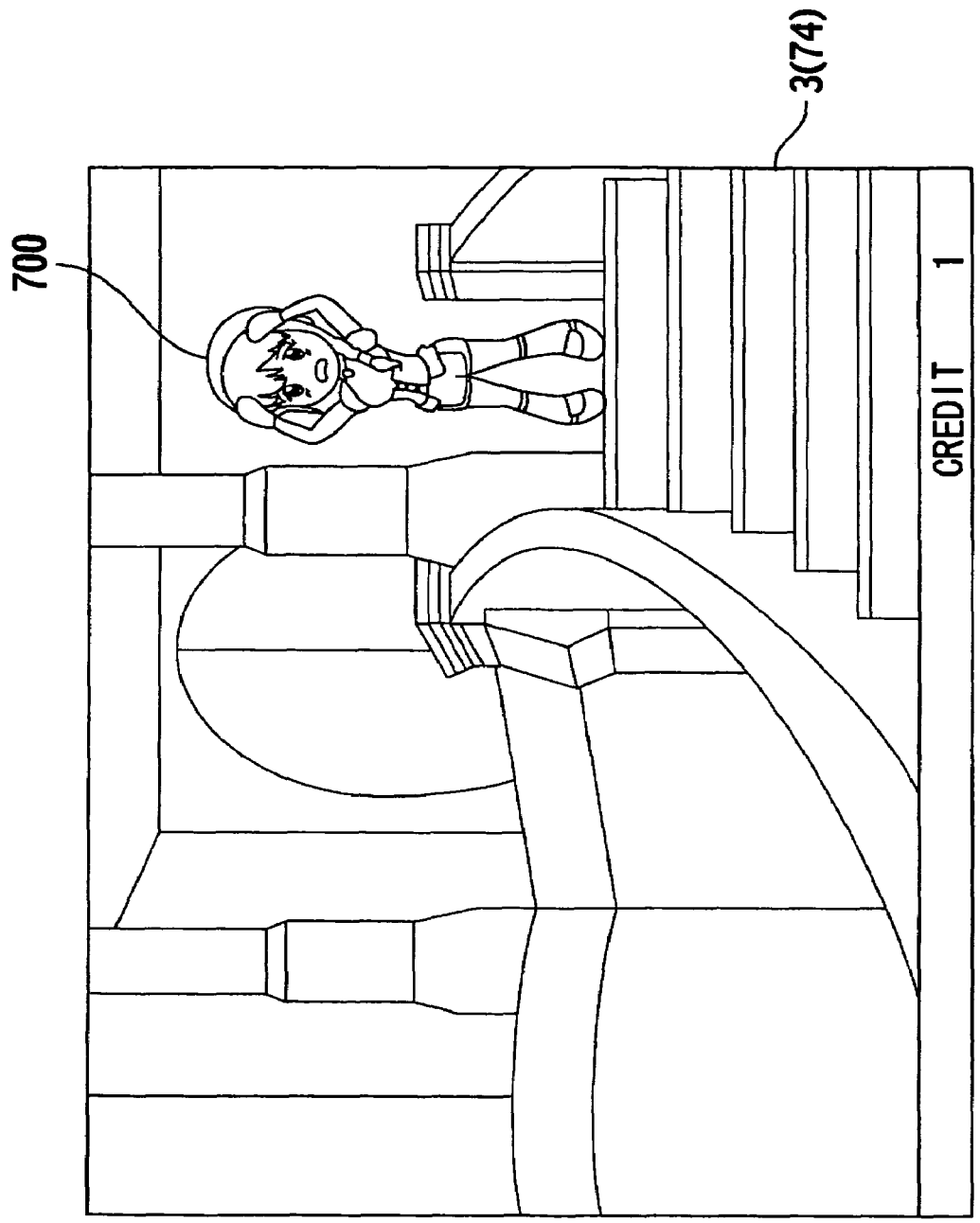
FIG. 9 shows an example of a screen in which the display of the character has changed after transitioning from the condition in FIG. 8.

FIG. 9 provides an example that follows the condition shown in FIG. 8, of the screen displayed on the display 3 when the CPU 32 runs the regular interruption processes (refer to FIG. 6). In this example, a performance pattern coordinated to the head region 701, that makes changes to the display of the character as follows, is executed. That is to say, the character touches her head region and the display of the character changes so that the character acts to show anxiety about something.

Figure 10:
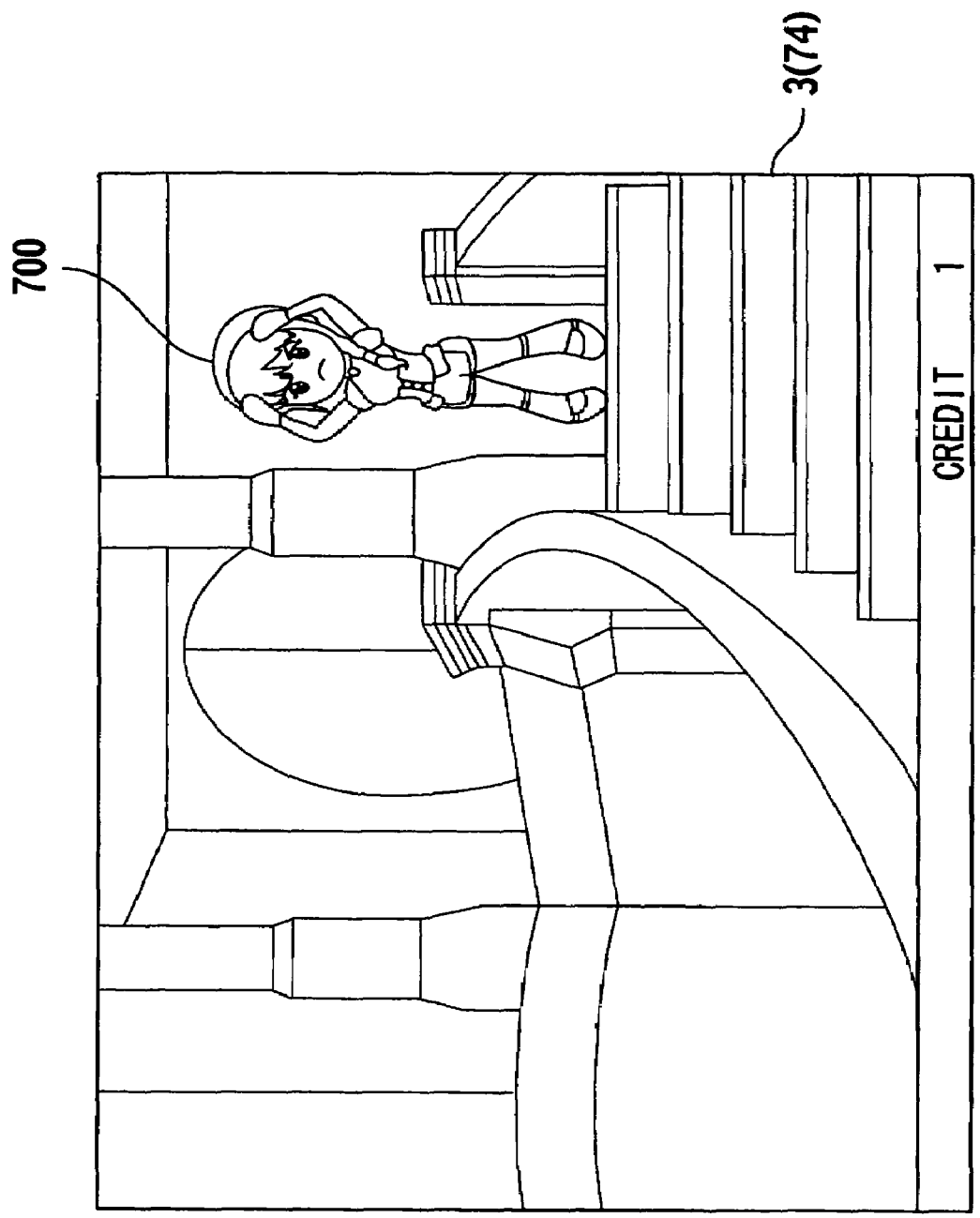
FIG. 10 shows an example of another screen in which the display of the character has changed after transitioning from the condition in FIG. 8.

On the other hand, if a player uses his finger F to touch the head region 701 of the screen displayed in FIG. 7B and continues this finger contact for a long duration or makes this contact for a short duration but not less than five times, a different change in the display of the character than that shown in FIG. 9 occurs. This condition is shown in FIG. 10. In the example shown in FIG. 10 the head part of the character 700 is touched and the change in the display of the character indicates an action of anger.

Figure 11:
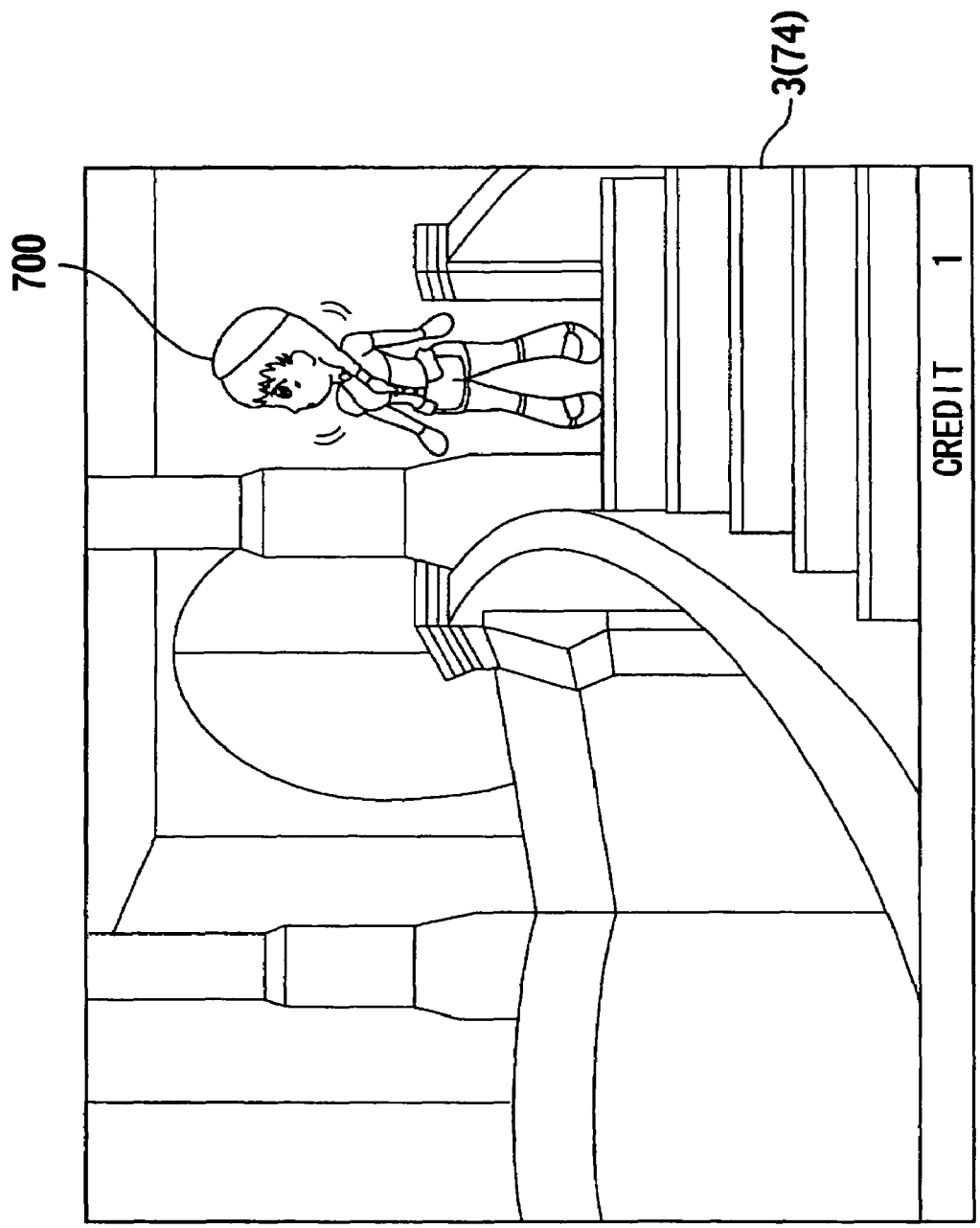
FIG. 11 shows still another screen in which the display of the character has changed after transitioning from the condition in FIG. 8.

Further, if a player uses his finger F to touch the head region 701 of the screen displayed in FIG. 7B by moving his finger around the head region of the character drawing a trajectory, a different change in the display of the character than that shown in FIG. 9 and FIG. 10 occurs. This condition is shown in FIG. 11. In the example shown in FIG. 11 the head part of the character 700 is touched and the change in the display of the character indicates an action in which the character looks around her.

Figure 12:
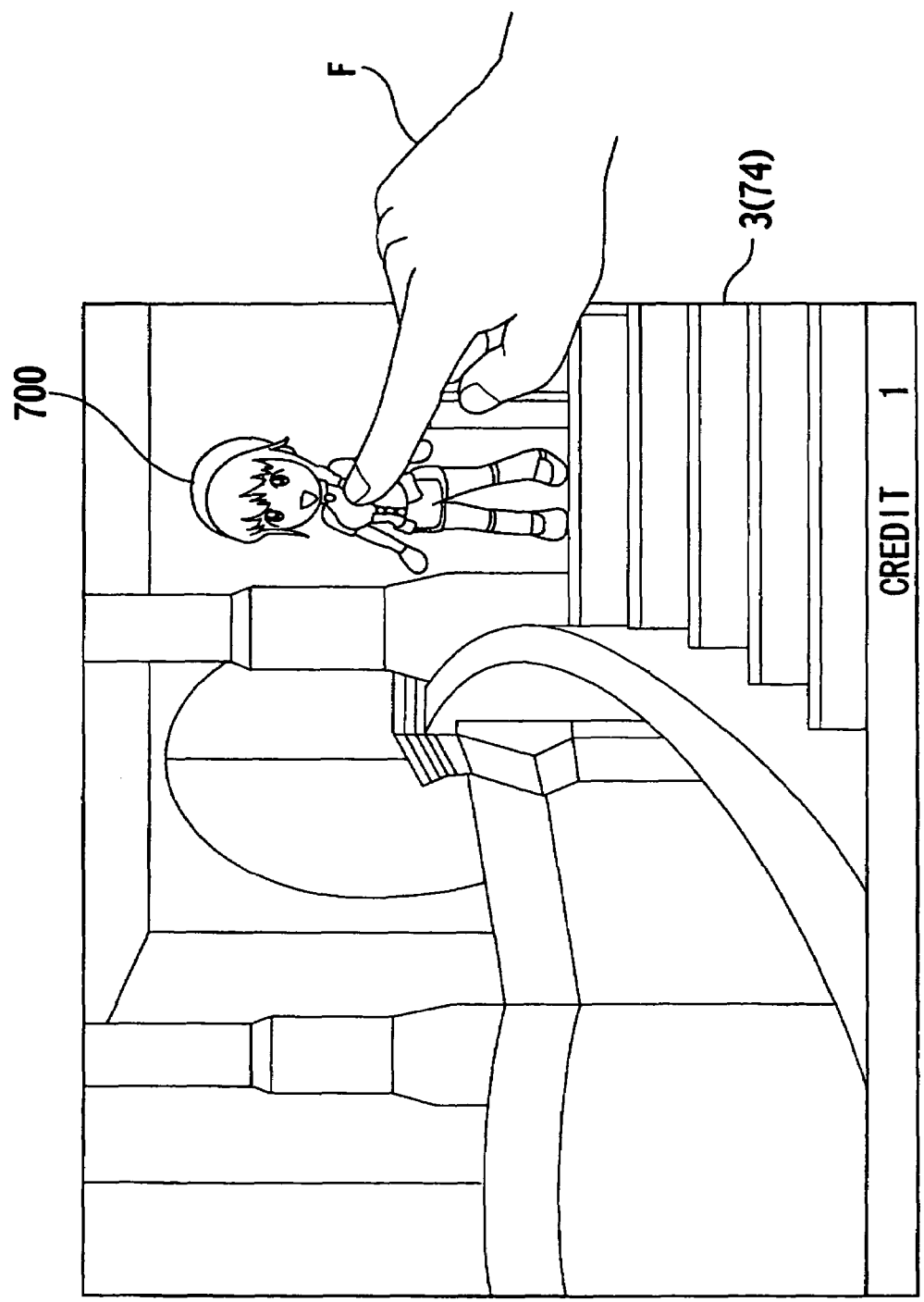
FIG. 12 shows a character in the game screen shown in FIG. 7B being touched by a player.
Figure 13:
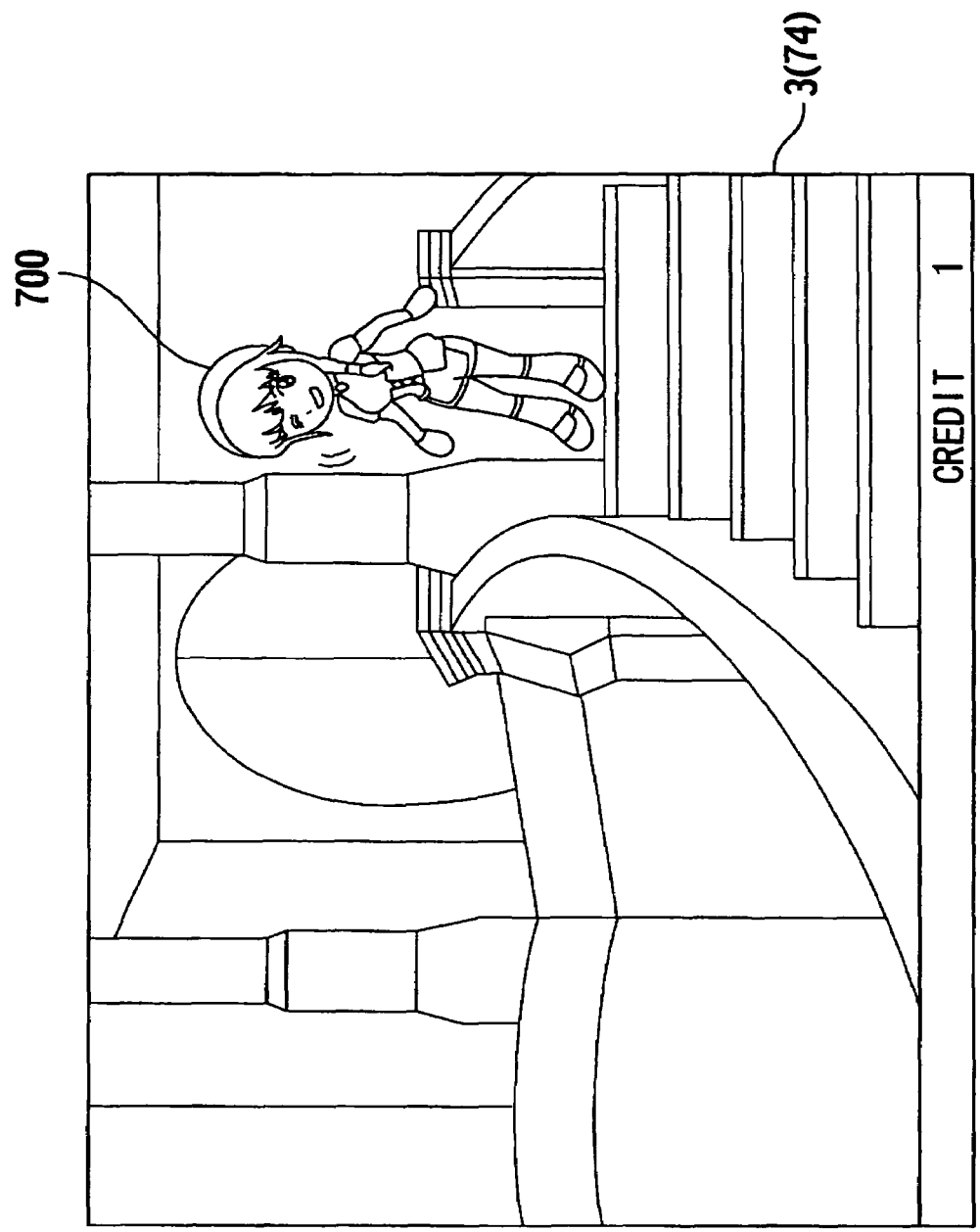
FIG. 13 shows an example of a screen in which the display of the character has changed after transitioning from the condition in FIG. 12.

5.2 Example of Changes in Display Occurring Through Contact to the Thoracic Region FIG. 12 shows the condition in which a player, using his finger F, touches the thoracic region 702 shown in the screen displayed in FIG. 7B, between one and four times for a short time duration. After this contact has been made the screen displayed on the display 3 transitions to the screen shown in FIG. 13. FIG. 13 provides an example that follows the condition shown in FIG. 12, of the screen displayed on the display 3 when the CPU 32 runs the regular interruption processes (refer to FIG. 6). In this example, a performance pattern coordinated to the thoracic region 702, that makes changes to the display of the character as follows, is executed. That is to say, when the character is touched in the thoracic region the display of the character changes so that the character performs actions resulting from being lightly pushed by a person.

Figure 14:
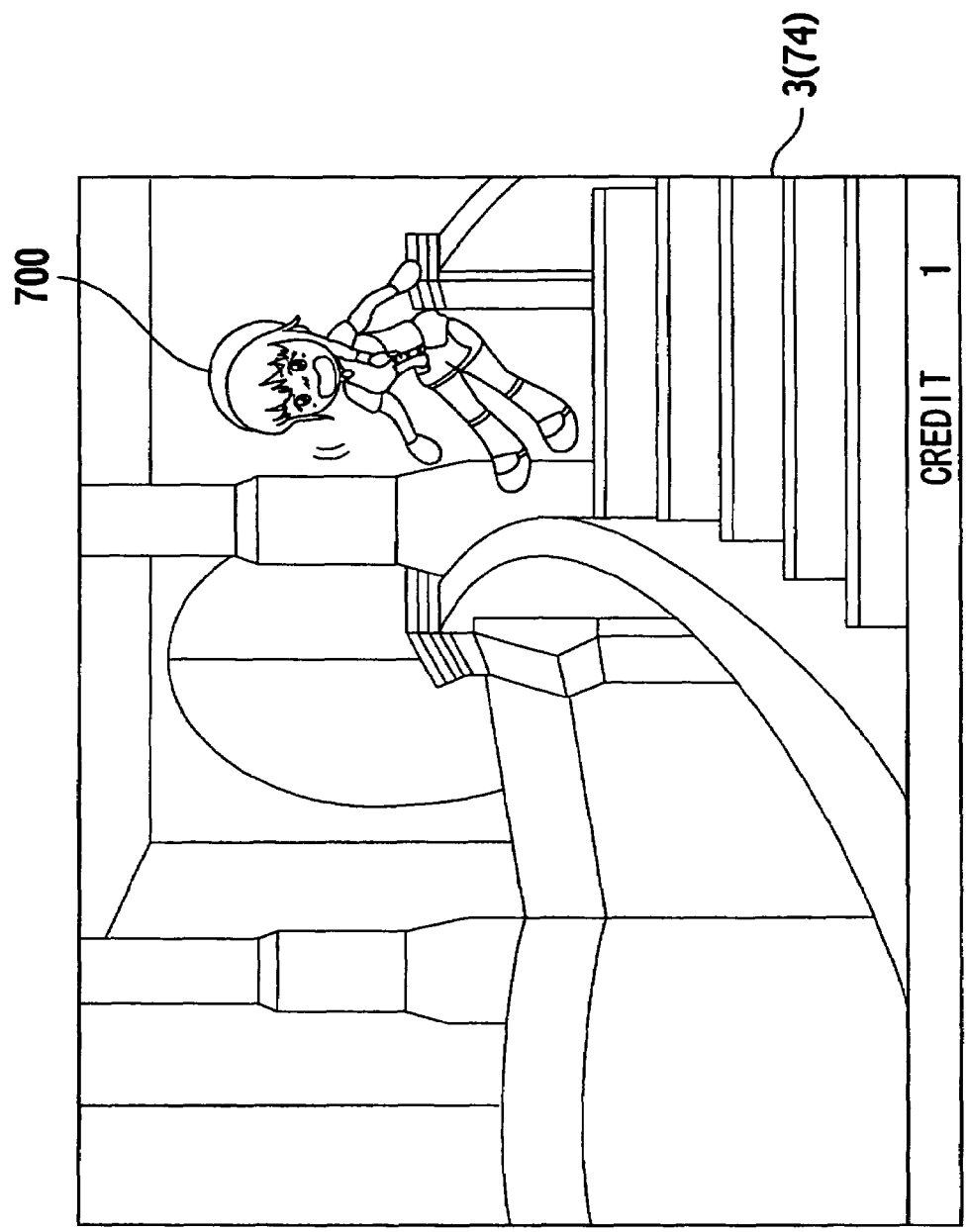
FIG. 14 shows an example of another screen in which the display of the character has changed after transitioning from the condition in FIG. 12.

On the other hand, if a player uses his finger F to touch the thoracic region 702 of the screen displayed in FIG. 7B and continues this finger contact for a long duration or makes this contact for a short duration but not less than five times, a different change in the display of the character than that shown in FIG. 13 occurs. This condition is shown in FIG. 14. In the example shown in FIG. 14 the character acts as though pushed strongly by a person and the display of the character changes to indicate a disgruntled expression.

Figure 15:
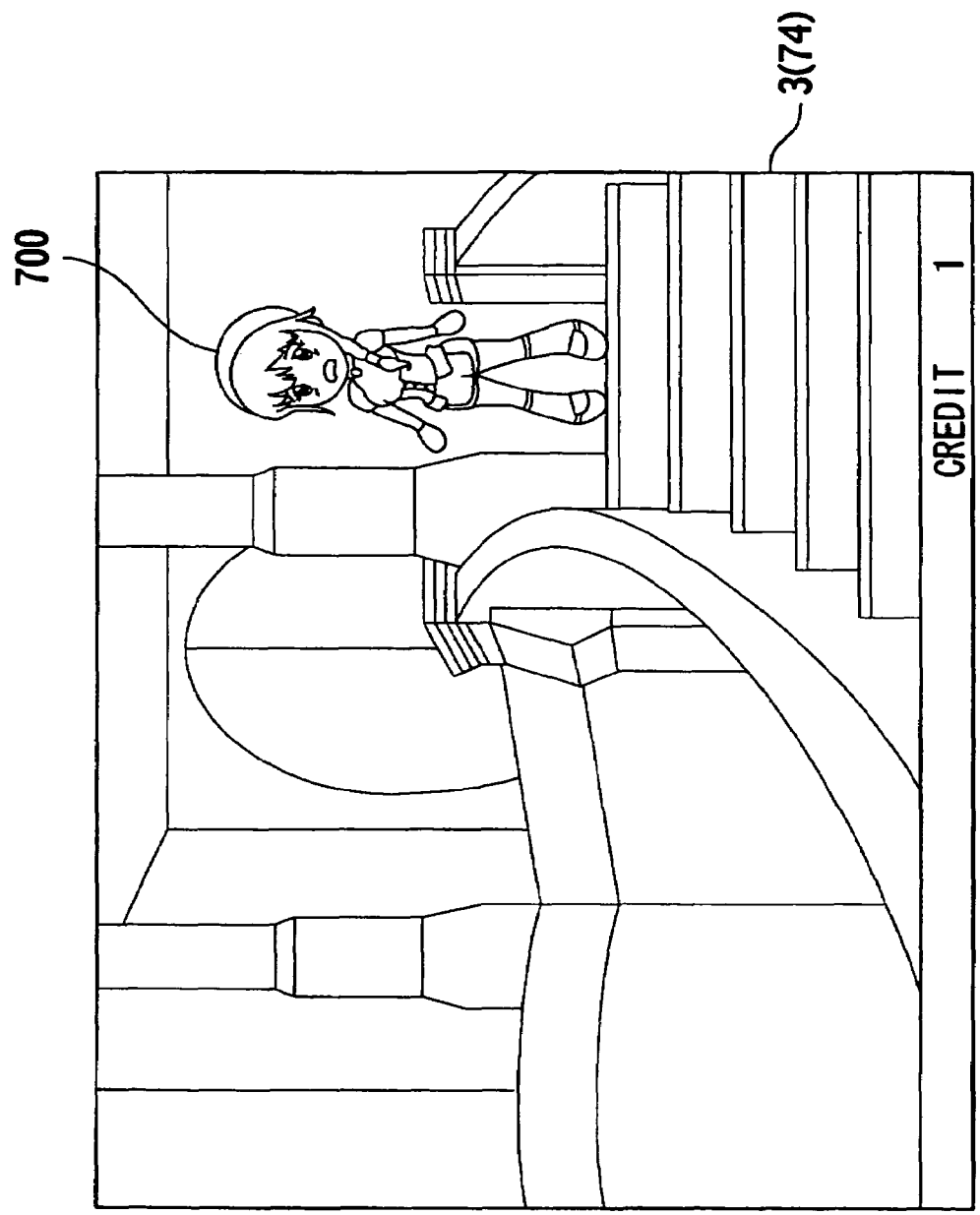
FIG. 15 shows still another screen in which the display of the character has changed after transitioning from the condition in FIG. 12.

Further, if a player uses his finger F to touch the thoracic region 702 of the screen displayed in FIG. 7B by moving his finger around the thoracic region of the character drawing a trajectory, a different change in the display of the character than that shown in FIG. 13 and FIG. 14 occurs. This condition is shown in FIG. 15. In the example shown in FIG. 15 the change in the display of the character indicates that the character is at a loss.

Figure 16:
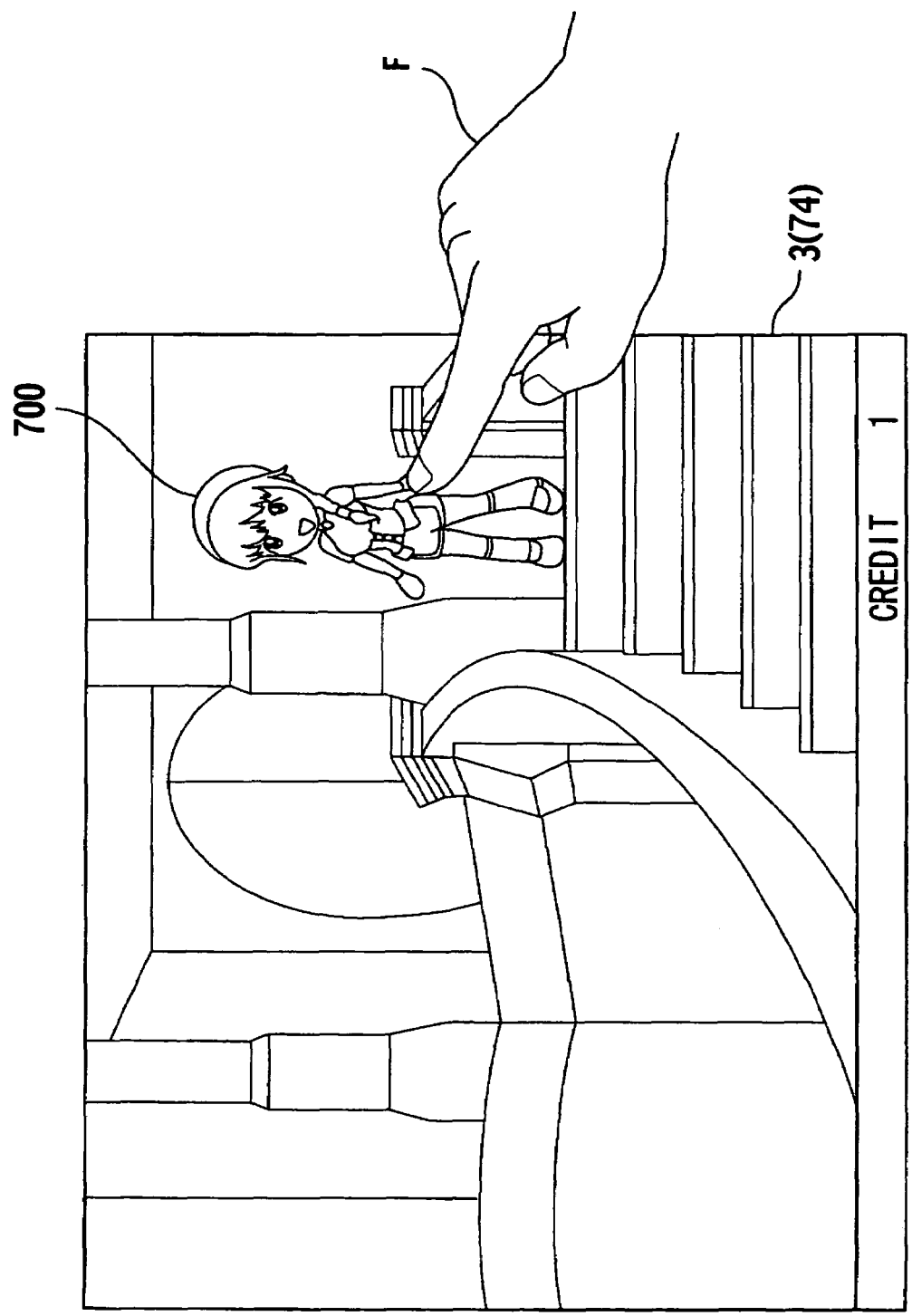
FIG. 16 shows a character in the game screen shown in FIG. 7B being touched by a player.
Figure 17:
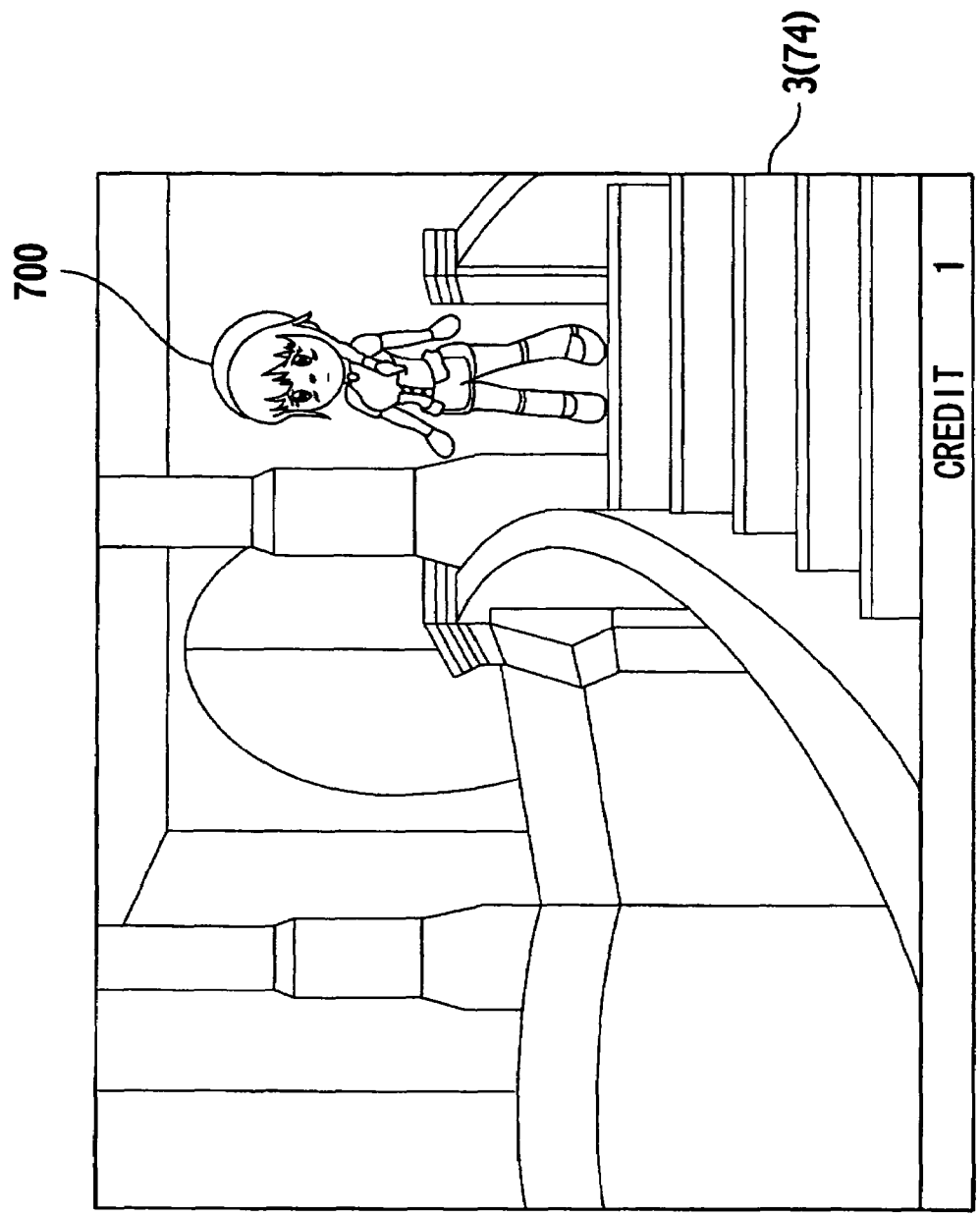
FIG. 17 shows an example of a screen in which the display of the character has changed after transitioning from the condition shown in FIG. 16.

5.3 Example of Changes in Display Occurring Through Contact to the Waist Region FIG. 16 shows the condition in which a player, using his finger F, touches the waist region 703 shown in the screen displayed in FIG. 7B, between one and four times for a short time duration. After this contact has been made the screen displayed on the display 3 transitions to the screen shown in FIG. 17 by the running of the regular interruption process. FIG. 17 provides an example that follows the condition shown in FIG. 16, of the screen displayed on the display 3 when the CPU 32 runs the regular interruption processes (refer to FIG. 6). In this example, a performance pattern coordinated to the waist region 703, that makes changes to the display of the character as follows, is executed. That is to say, when the character is touched in the waist region the display of the character changes so that the display of the character changes to indicate an arising expression of embarrassment.

Figure 18:
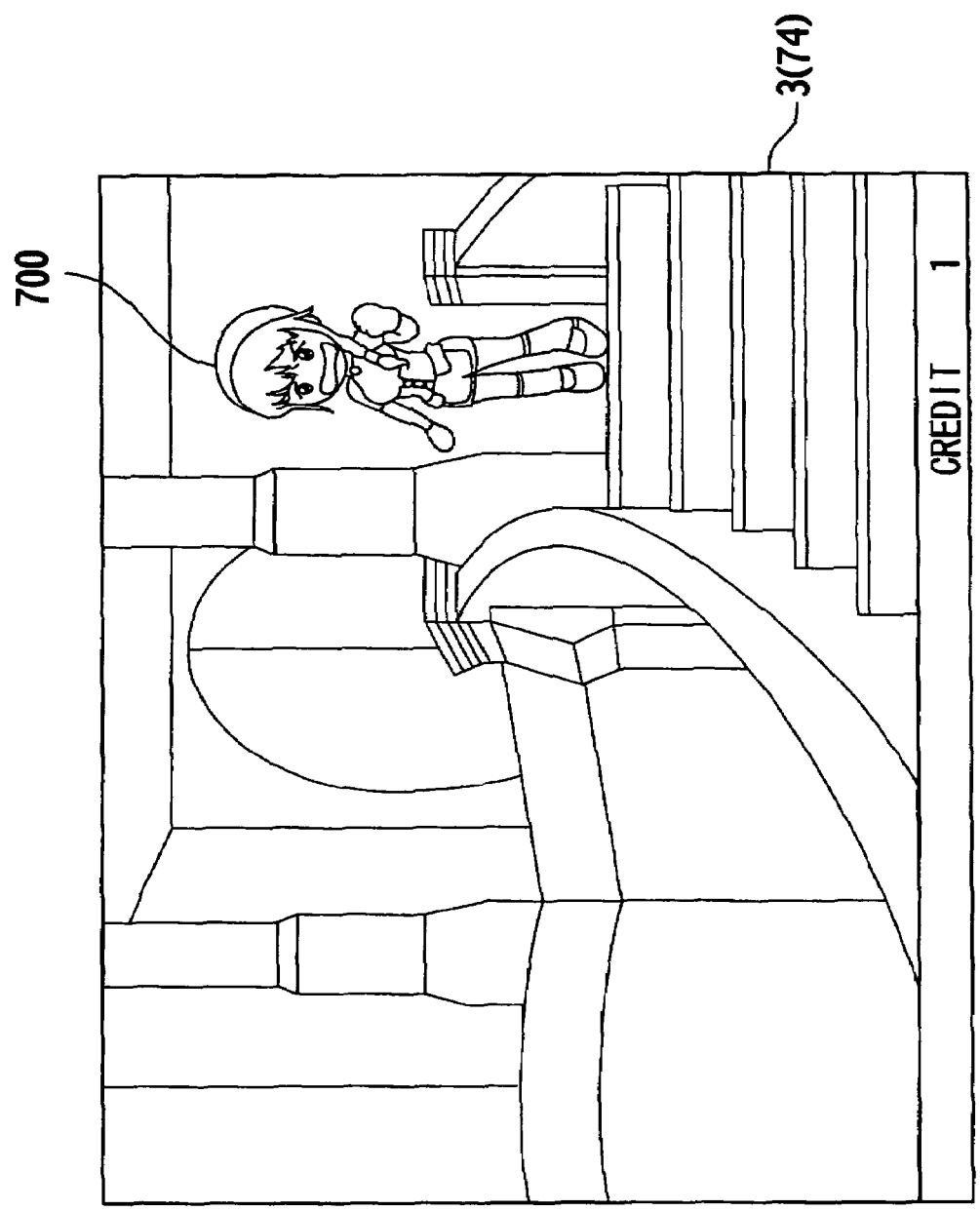
FIG. 18 shows an example of another screen in which the display of the character has changed after transitioning from the condition in FIG. 16.

On the other hand, if a player uses his finger F to touch the waist region 703 of the screen displayed in FIG. 7B and continues this finger contact for a long duration or makes this contact for a short duration but not less than five times, a different change in the display of the character than that shown in FIG. 17 occurs. This condition is shown in FIG. 18. In the example shown in FIG. 18 the display of the character changes to indicate an expression and actions resulting from an outburst of anger by the character.

Figure 19:
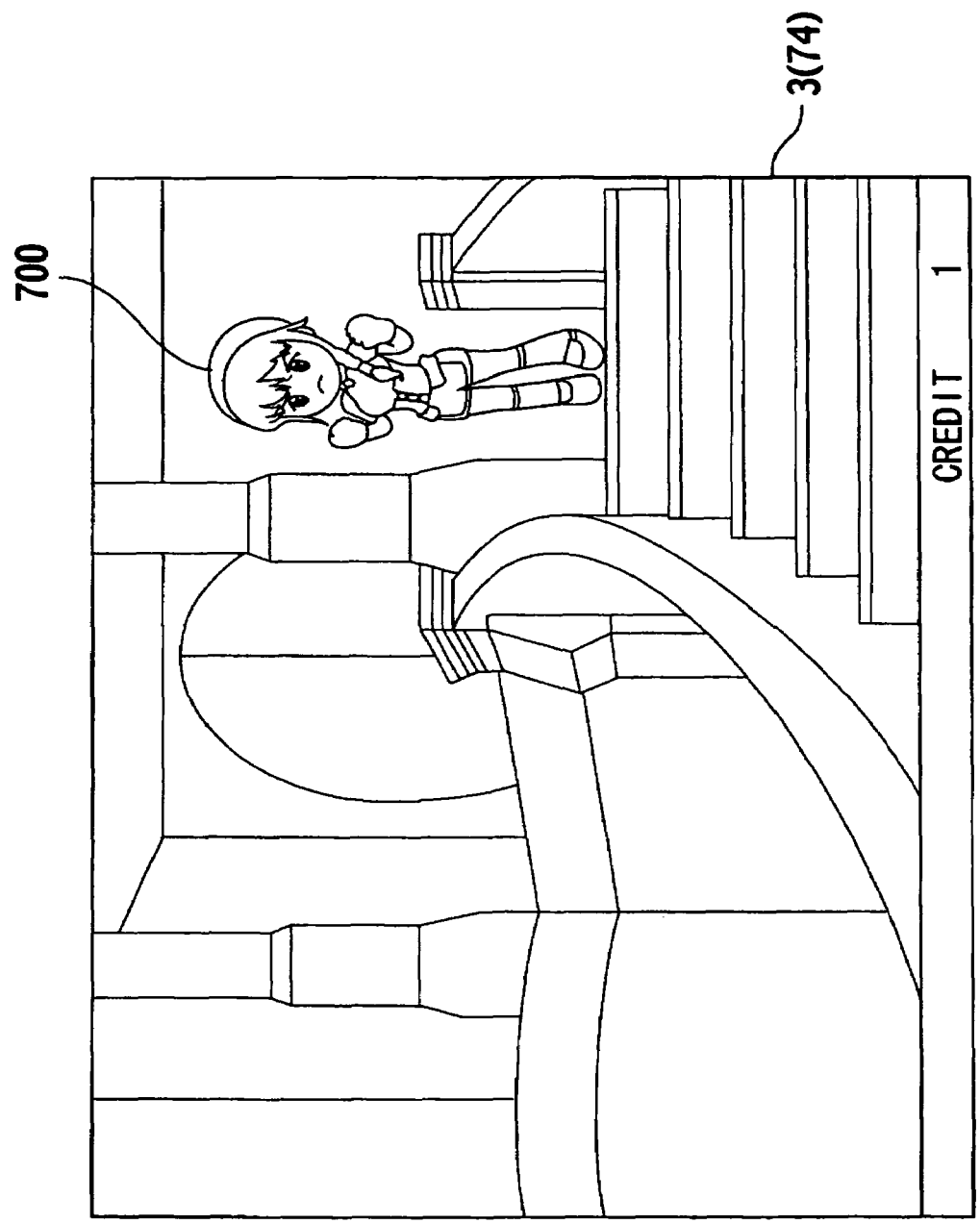
FIG. 19 shows still another screen in which the display of the character has changed after transitioning from the condition in FIG. 16.

Further, if a player uses his finger F to touch the waist region 703 of the screen displayed in FIG. 7B by moving his finger around the waist region of the character drawing a trajectory, a different change in the display of the character than that shown in FIG. 17 and in FIG. 18 occurs. This condition is shown in FIG. 19. In the example shown in FIG. 19 the display of the character changes to indicate a scowling expression and accompanying standoff action.

5.4 Example of Changes in Display Occurring Through Contact to the Legs Region

Figure 20:
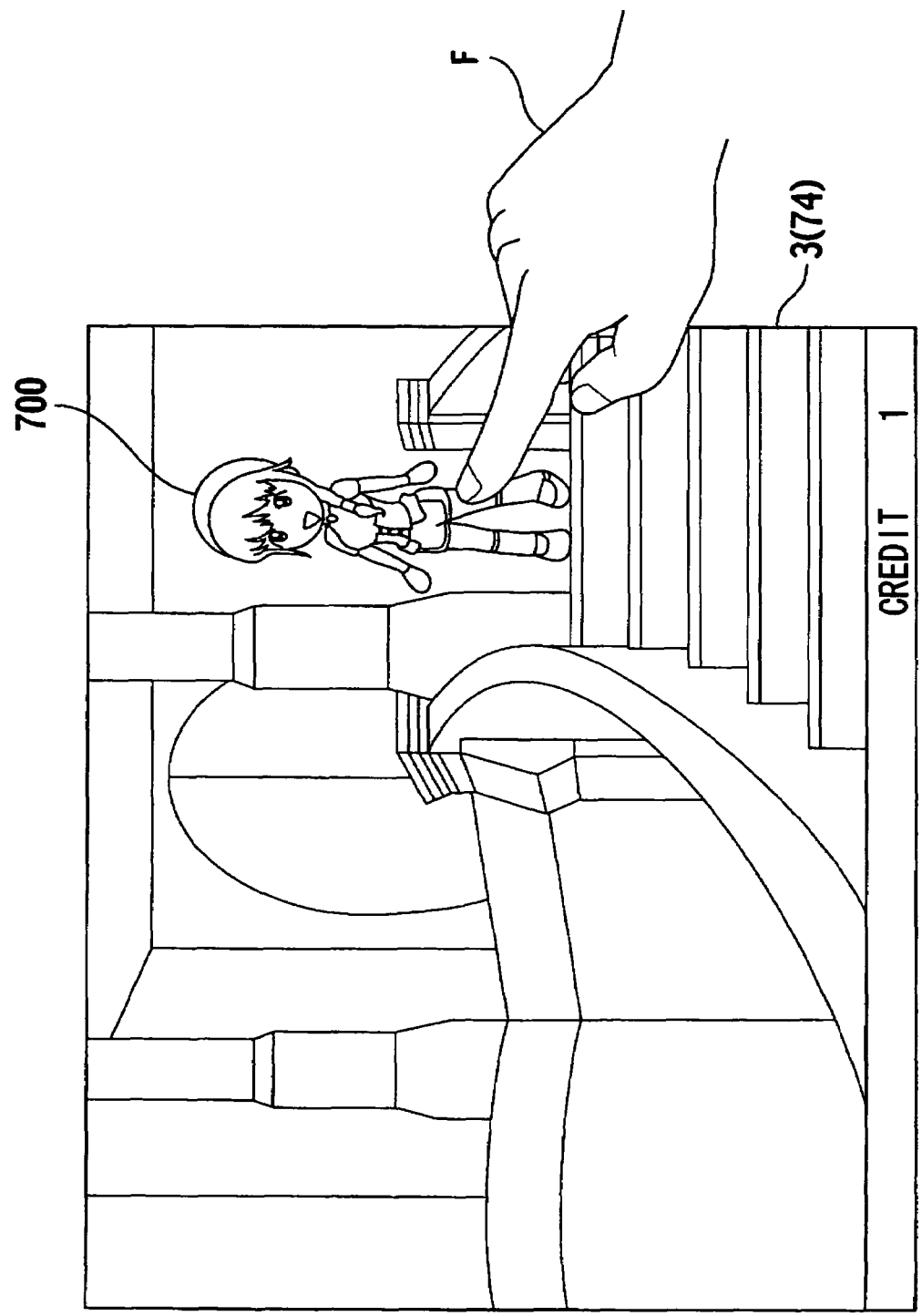
FIG. 20 shows a character in the game screen shown in FIG. 7B being touched by a player.
Figure 21:
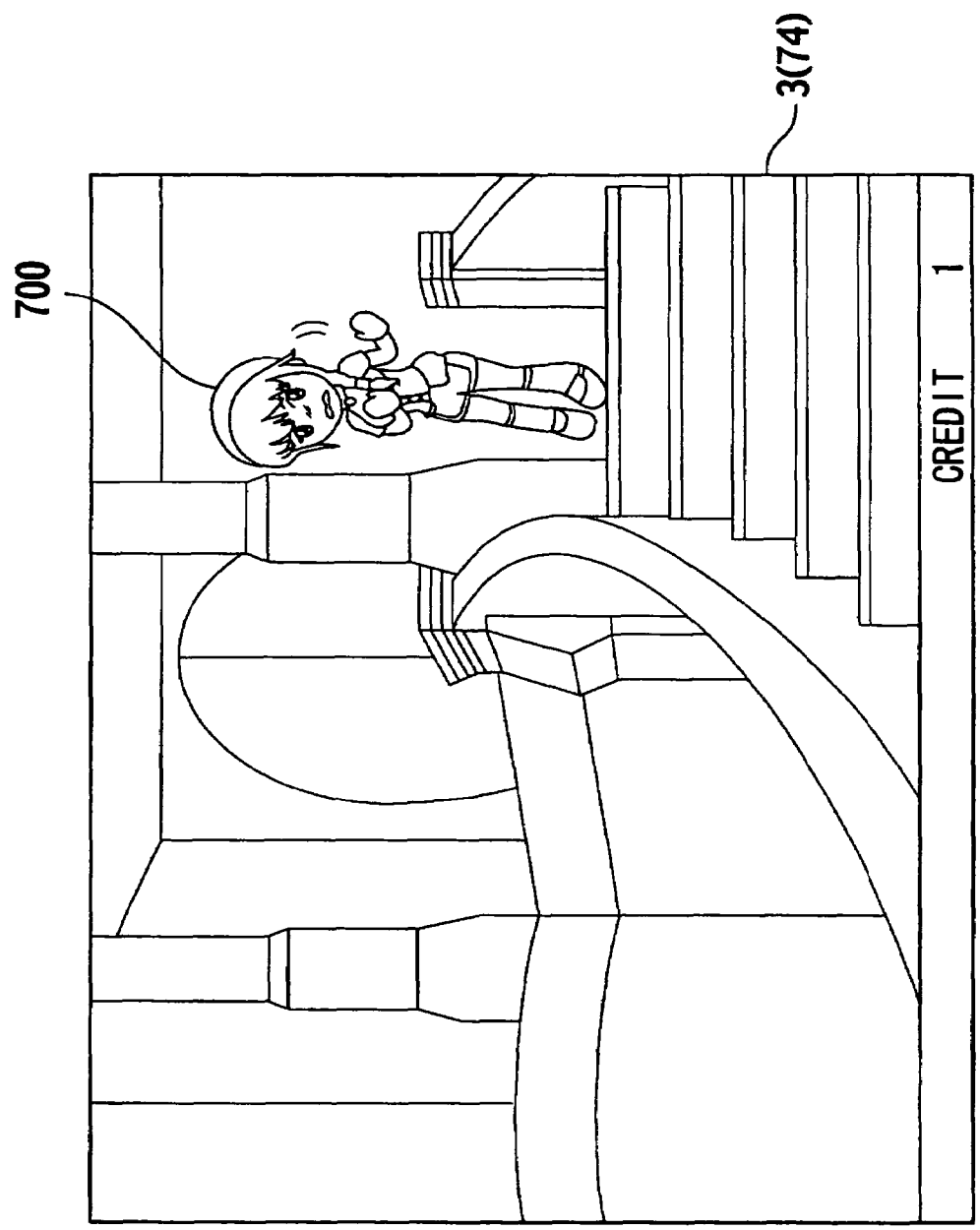
FIG. 21 shows an example of a screen in which the display of the character has changed after transitioning from the condition shown in FIG. 20.

FIG. 20 shows the condition in which a player, using his finger F, touches the legs region 704 shown in the screen displayed in FIG. 7B, between one and four times for a short time duration. After this contact has been made the screen displayed on the display 3 transitions to the screen shown in FIG. 21 by the running of the regular interruption process. FIG. 21 provides an example that follows the condition shown in FIG. 20, of the screen displayed on the display 3 when the CPU 32 runs the regular interruption processes (refer to FIG. 6). In this example, a performance pattern coordinated to the legs region 704, that makes changes to the display of the character as follows, is executed. That is to say, when the character is touched in the legs region the display of the character changes to indicate performance of an action to gently avoid the contact.

Figure 22:
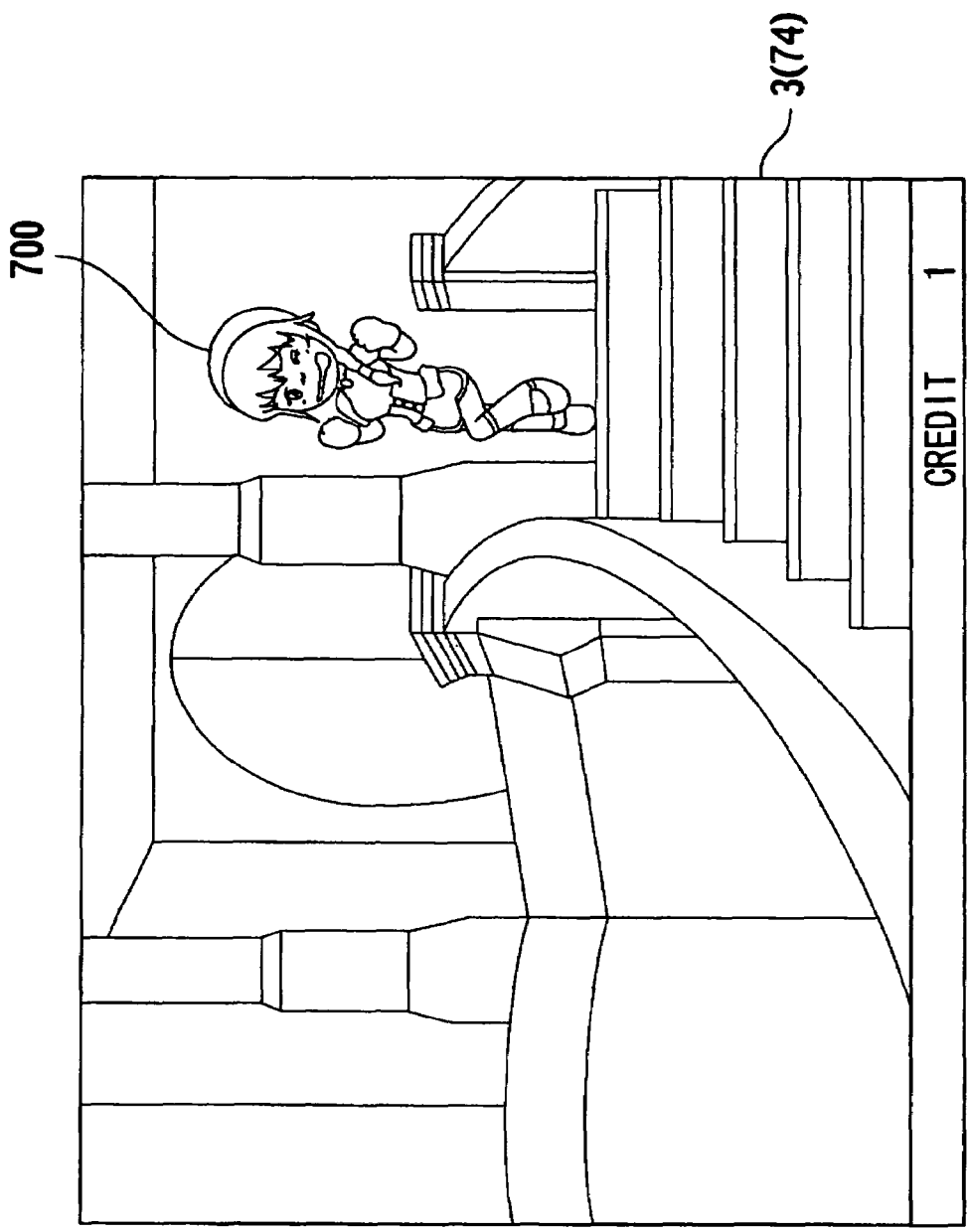
FIG. 22 shows an example of another screen in which the display of the character has changed after transitioning from the condition in FIG. 20.

On the other hand, if a player uses his finger F to touch the legs region 704 of the screen displayed in FIG. 7B and continues this finger contact for a long duration or makes this contact for a short duration but not less than five times, a different change in the display of the character than that shown in FIG. 21 occurs. This condition is shown in FIG. 22. In the example shown in FIG. 22 the display of the character changes to indicate an expression and actions resulting from the character experiencing pain.

Figure 23:
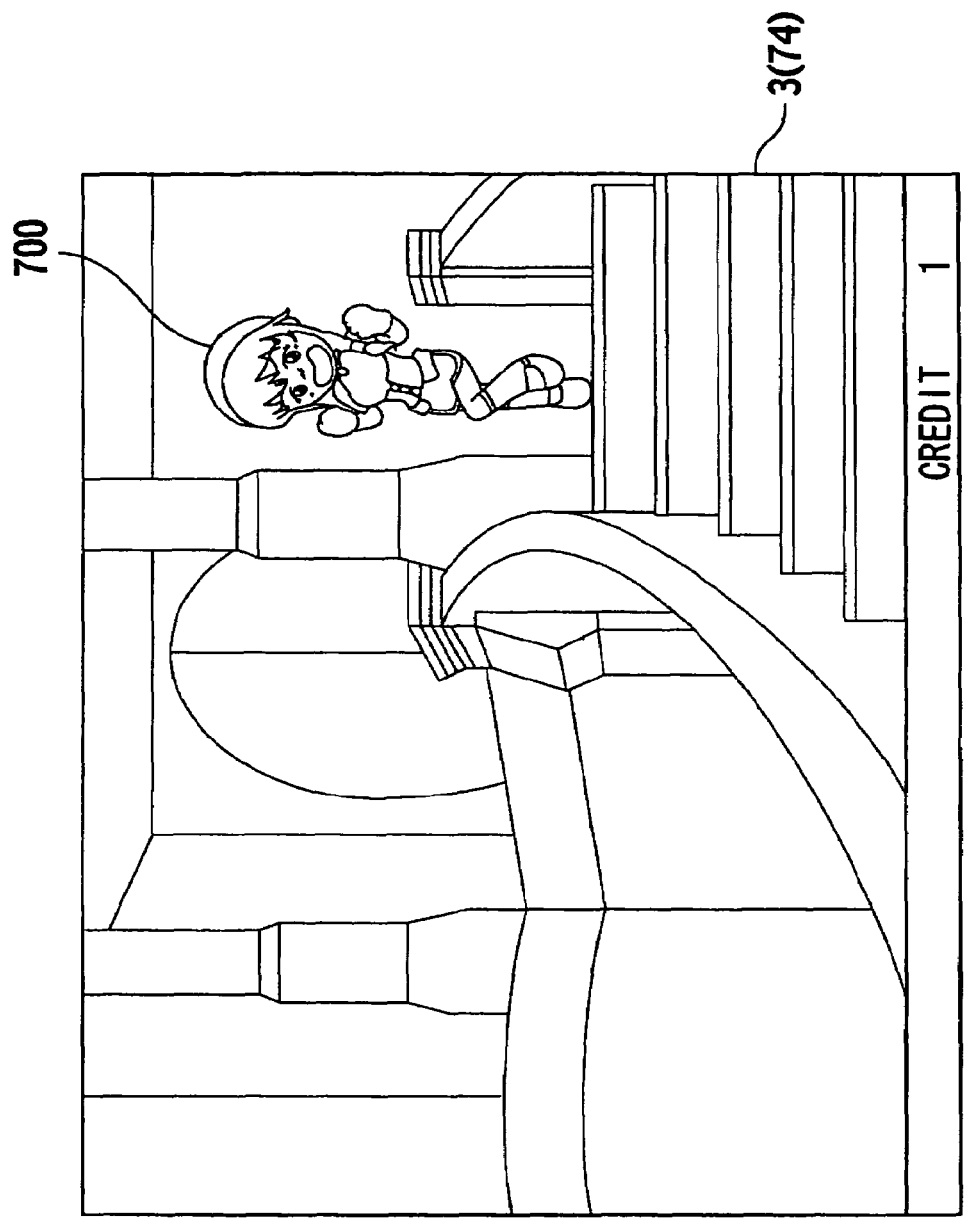
FIG. 23 shows still another screen in which the display of the character has changed after transitioning from the condition in FIG. 20.

Further, if a player uses his finger F to touch the legs region 704 of the screen displayed in FIG. 7B by moving his finger around the legs region of the character drawing a trajectory, a different change in the display of the character than that shown in FIG. 21 and in FIG. 22 occurs. This condition is shown in FIG. 23. In the example shown in FIG. 23 the display of the character changes to indicate that she is concerned about something at the bottom of her leg.

As described, according to the gaming machine 1 of this embodiment of the present invention, if a part of the body of a character displayed on a screen during the game is touched by a player, the display of the character changes (performance) in response to the part of the body of the character that is touched and the contact mode.

SECOND EMBODIMENT

The external and internal configurations of the gaming machine according to this second embodiment are the same as those of the gaming machine according to the first embodiment, accordingly, a description of these is omitted here.

3. Functions of the Gaming Machine According to the Second Embodiment

The functions of the gaming machine 1 according to this second embodiment are run by a program stored in the ROM 34, which program is executed by the microcomputer 31, or more specifically still, by the CPU 32. The various functions realized by the microcomputer 31, or more specifically, the CPU 32 executing this program, will now be described.

Figure 25:
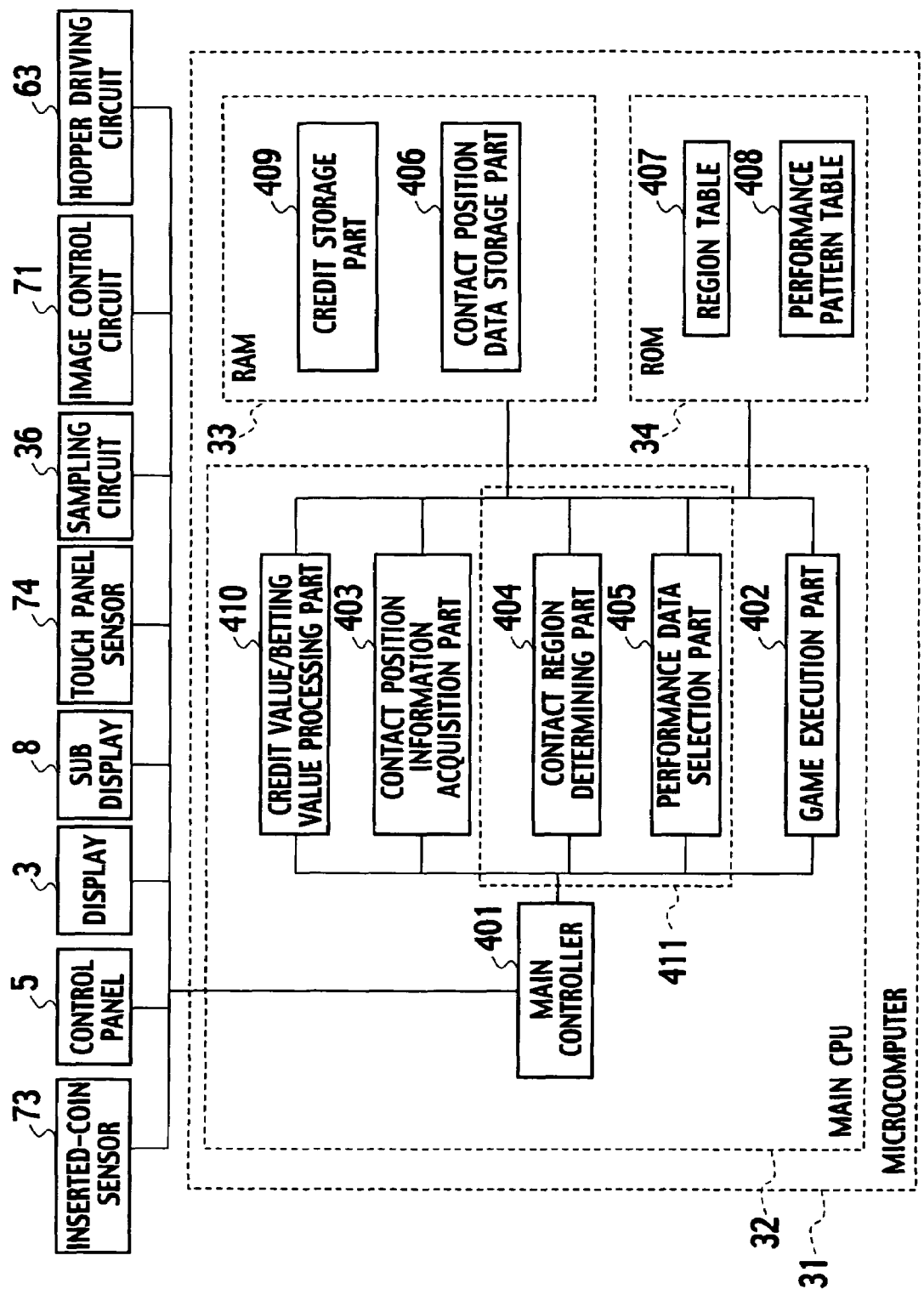
FIG. 25 is a block diagram showing the functions of the main CPU and peripheral devices of the second embodiment of the present invention.

FIG. 25 is a block diagram showing the functions of the gaming machine 1 according to the second embodiment. In the example shown in FIG. 25, the CPU 32 functions as the main control part 401, a credit value/betting value processing part 410 that receives data from this main control part 401, the contact position information acquisition part 403, the contact region determining part 404, the performance data selection part 405 and the game execution part 402.

The main control part 401 is the same as the main control part 401 of the first embodiment, thus a description of this part is omitted here.

The Credit Value/Betting Value Processing Part

The credit value/betting value processing part 410 adds or reduces value ("credit value") corresponding to the number of coins belonging to the player held in the gaming machine 1. An increase or decrease in this credit value is performed in response to instructions issued from the main control part 401 when there is a payout of coins occurring when a player wins a game or when the player depresses the payout button 6*a*. This credit value is stored in a credit value storage part 409 that comprises a determined storage region of the RAM 33 described subsequently and when the game commences, the number of coins ("betting value") instructed by the player depressing the betting button is stored in a different, determined storage region of the RAM 33.

More specifically, once the main control part 401 receives a coin input detection signal from the inserted-coin sensor 73, the main control part 401 starts up the credit value/betting value processing part 410. The credit value/betting value processing part 410 then increases or decreases the credit value stored in a credit value storage part 409 described subsequently, in compliance with the coin input detection signal.

Further, if the main control part 401 receives a payout signal from the control panel 5, the main control part 401 starts up the credit value/betting value processing part 410. The credit value/betting value processing part 410 then sends a drive instruction to the hopper driving circuit 63 in compliance with this payout signal, thereby paying out the coins to the hopper 64 and makes a reduction from the credit value stored in a credit value storage part 409 described subsequently, of the number of coins paid out to the hopper 64.

Moreover, the credit value/betting value processing part 410 adds value corresponding to the number of coins acquired by a player if the player wins, to the value stored in the credit value storage part 409. The main control part 401 functions as an insertion determining means that references the credit value storage part 409 and determines whether or not there has been an input of credit.

The contact position information acquisition part 403, the contact region determining part 404 and the performance data selection part 405 are the same as those respective parts according to the first embodiment, thus a description of these parts is omitted here.

The contact region determining part 404 and the performance data selection part 405 comprise a character display mode change part 411 equivalent to a character image changing means.

The Game Execution Part

The game execution part has the function of executing the main game of the gaming machine 1. The character display mode change part 411 changes the display mode of a character on the screen displayed on the display 3 prior to the game being run by the game execution part 402, that is to say, changes the display mode of a character in connection with what is called the demo screen.

The game execution part 402 is started up by the main control part 401 when a player makes input to instruct commencement of the game, runs the game program housed in advance in the ROM 34 and allows the player to play the game.

Further, the microcomputer 31 has the ROM 34 and RAM 33 that functions together with the CPU 32. The RAM 33 functions as the credit value storage part 409 described previously and the contact position data storage part 406. As a description of these parts occurs prior, a further description is omitted here.

The ROM 34 functions as the region tables 407 and the performance pattern tables 408.

These tables have been described prior and a further description is thus omitted here.

This completes the description of the configuration and functions of the gaming machine 1 according to the second embodiment.

4. Example of Operation of the Gaming Machine

To continue, an example of the operation of the above described gaming machine 1 according to the second embodiment will now be described with reference to FIGS. 26 and 27.

Figure 26:
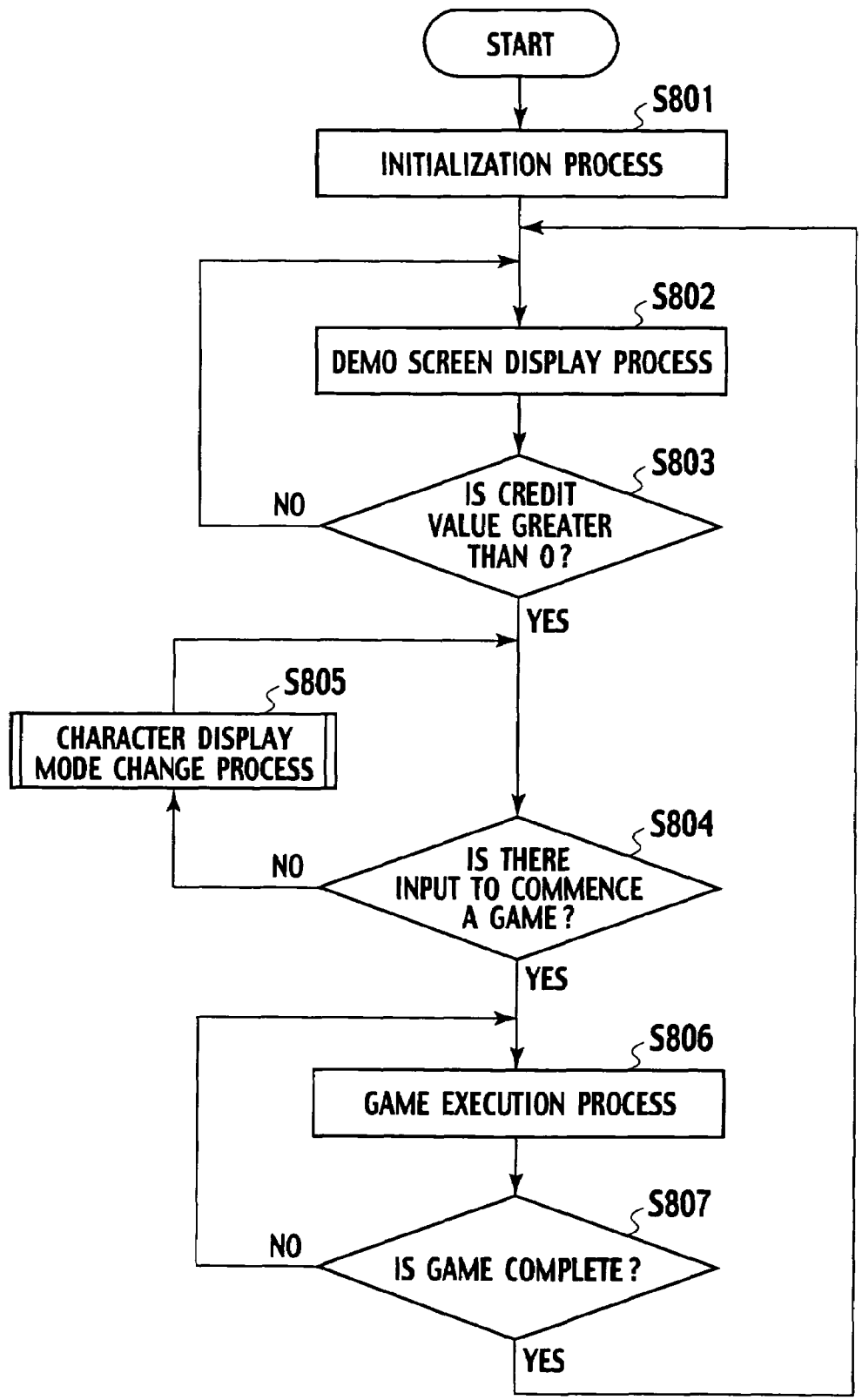
FIG. 26 is a flowchart showing an example of the main process executed by the gaming machine according to the second embodiment.
Figure 27:
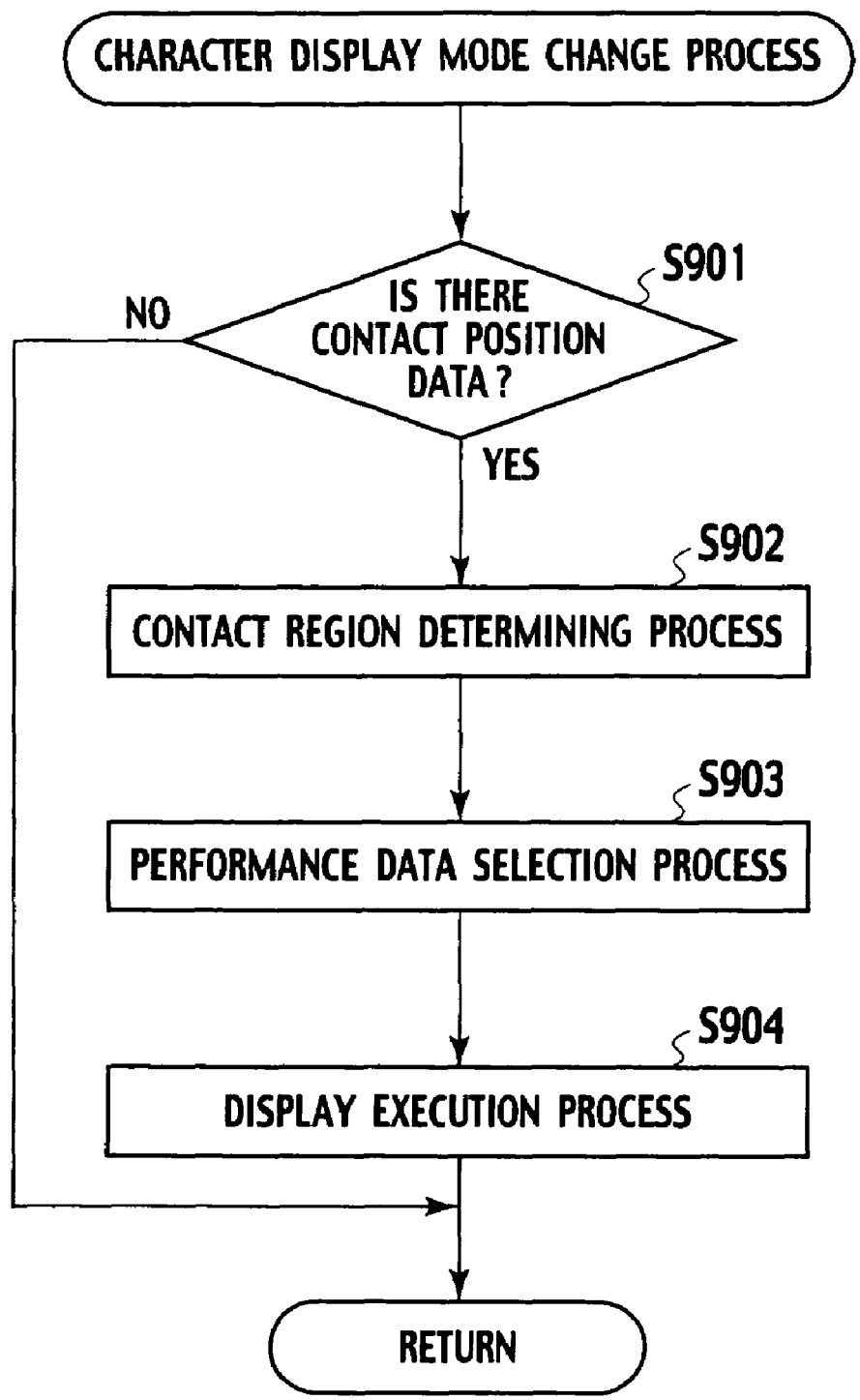
FIG. 27 is a flow chart showing an example of the character display mode change process performed during execution of game processes according to the second embodiment.

FIG. 26 is a flowchart showing an example of the main process of the gaming machine according to the second embodiment.

Once power is input to the gaming machine 1 the CPU 32 performs initialization processes for each of the circuits such as the RAM 33 etc. (S801).

Next, the CPU 32 runs the demo screen display process (S802) and issues instructions to the image control circuit 71 in order to make the display of the demo screen on the display 3. The image control circuit 71 passes image data prescribed for the demo screen to the display 3 and displays this demo screen image. Note that the character that comprises the subject of the character display mode change process described subsequently is the character drawn as this screen image.

Thereafter, the CPU 32 references the RAM 33, or more specifically the credit value storage part 409 to determine whether or not the current credit value is greater than 0 (S803). This means that the CPU 32 determines whether or not at least one coin has been inserted in the gaming machine 1 by a player. If the player has inserted at least one coin in the gaming machine 1 it is considered that the player has a sufficient desire to play a game on the gaming machine 1. The character display mode change process is performed in order to attract the interest of this kind of player and to convey the feeling of operating the touchpad to this kind of player before the game actually commences.

If the above determination (S803) produces a result by the CPU 32 that the credit value is no greater than 0 (i.e. is 0), the CPU 32 returns to S802 and continues the demo screen display process.

On the other hand, if at the above described determination step (S803), the CPU 32 determines that credit value is greater than 0, the CPU 32 determines whether or not the player has performed input to commence a game (e.g. whether the player has depressed the start button) (S804).

If the CPU 32 determines that the player has not performed input to commence a game (e.g. depressed the start button) the CPU 32 runs the character display mode change process (S805). FIG. 27 is a flow chart showing an example of the character display mode change process according to the second embodiment. The character display mode change process will now be described with reference to FIG. 27.

The character display mode change process is a process performed by the CPU 32 acting as a character display mode change part 411, in which a determination is made as to whether or not the character displayed on the demo screen has been touched, and if it has been touched, to change the display mode of that character in response to the contact mode.

Once the character display mode change process has commenced, the CPU 32, or more specifically, the contact position information acquisition part 403, checks the credit value storage part 409 of the RAM 33 and determines whether or not there is contact position data, that is, data output from the touch panel (S901). If there is no contact position data there has been no contact to the character from the player, thus it is not necessary to change the character display mode, in which case no other process is run and the character display mode change process finishes (S901, No).

On the other hand, if at S901 the CPU 32 determines that there is position data (S901, Yes), the CPU 32, functioning as the character display mode change part 411, runs the contact region determining process (S902). This contact region determining process is a process to determine, based on the contact position data, which part of the character a player has touched, or, by what mode (the duration for which the contact continued, the shape of the trajectory drawn by the contact points etc.) the character was touched. This contact region determining process is a process performed by the contact region determining part 404.

Once the result of the determination at the contact region determining process (S902) is output, the CPU 32, functioning as the character display mode change part 411, runs the performance data selection process (S903).

This performance data selection process (S903) is a process performed by the performance data selection part 405 described above, being a process in which it is determined how to change the character display in response to a result of the determination carried out at the contact region determining process (S902). Basically, the CPU 32, functioning as the performance data selection part 405, references the performance pattern table 408 and acquires the appropriate performance pattern code.

Next, the CPU 32, functioning as the character display mode change part 411, performs the display execution process (S904), which is a process to change the character display mode to provide the display on the display 3 in accordance with the performance content as determined at the preceding selection process step. Basically, here, the CPU 32 passes the performance pattern code required by referencing the performance pattern table 408 to the image control circuit 71, and the image control circuit 71 generates the determined moving image data in accordance with this performance pattern code, displaying the changing character display mode on the display 3.

The movements and expressions of the character displayed on the display 3 as coordinated to the contact region and contact mode are the same for this second embodiment as for the first embodiment, thus a description of these is omitted here.

This completes the character display mode process.

The description of the main process of the gaming machine 1 here continues, referring again to FIG. 26.

Once the character display mode change process (S805) has completed, the CPU 32 returns to S804 to determine whether or not there has been input to commence a game.

If the CPU 32 determines that there has been input to commence a game (S804, Yes), the CPU 32, functioning as the game execution part 402, performs processes to run the game (S806). Thus, the player is enabled to play the game provided by the gaming machine 1.

Once the game execution process (S806) completes, the CPU 32 determines whether or not the game has finished (S807). Finishing of the game is when it is determined that the credit value of the player is 0.

If the CPU 32 determines that the game has finished (S807, Yes), the CPU 32 returns to control the demo screen display process (S802), awaiting input of a coin from the player, to thereafter repeat each of the processes including the character display mode change process (S803 to S807).

On the other hand, if the CPU 32 determines that the game has not finished (S807, No), the CPU 32 repeats the game execution process (S806) and enables the player to play the game.

The gaming machine 1 according to this second embodiment of the present invention executes a change of the character display mode coordinated to the part of the body of the character displayed on the demo screen that is touched, on condition that the player inputs credit to the machine.

Also, while the present invention has been described above in more detail, it is apparent to those skilled in the art that the present invention is not limited to the embodiment described in the present invention. The device of the present invention can be embodied in modified or alternative forms without departing from the spirits and scopes of the present invention as set out in the appended claims. Accordingly, the description of the present invention is meant to be illustrative only and not limiting to the scope of the present invention.

What is claimed is:

1. A gaming machine comprising:
an image display device configured to display a determined image including a character image while a game is being played;
a contact detection device, disposed above the image display device, configured to detect a contact by a player;
a contact mode determining device configured to determine a contact part of the character image and a contact mode based on a detection result being output from the contact detection device; and
a character image changing device configured to change the character image based on the contact part and the contact mode,
wherein the contact mode is determined based on at least one of a contact time, a contact frequency, a contact interval, and a trajectory.

2. The gaming machine according to claim 1, wherein the contact detection device detects a contact position and a contact time, and the contact mode determining device determines the contact part and the contact mode based on the contact position and the contact time.

3. The gaming machine according to claim 2, wherein the contact time comprises a time of commencement of contact at the contact position until a time of completion of contact to the contact position.

4. The gaming machine according to claim 1, wherein the contact mode is determined based on information that includes at least one from among a contact duration from a time contact starts until a time contact finishes, a frequency of contact to a determined position within a determined time, an interval between a time of a first contact and a time of a second contact, or a trajectory traced by contact points.

5. The gaming machine according to claim 1, wherein the character image changing device displays the character image changed based on different performance patterns for each the contact part and contact mode, on the image display device.

6. The gaming machine according to claim 1, wherein the contact mode is determined based on at least one of a length of a contact time, a trajectory drawn by a plurality of contact points, and a speed of movement between at least two of the plurality of contact points.

7. The gaming machine according to claim 1, wherein the character image changing device changes the character image by selecting a performance pattern data coordinated to at least one of the contact part and the contact mode.

8. The gaming machine according to claim 7, wherein the performance pattern data is stored in a performance pattern table.

9. A gaming machine that requires insertion of game value as the price for a game comprising:
an image display device configured to display a determined image including a character image, before a game commences;
a contact detection device, disposed above the image display device, configured to detect a contact by a player;
an insertion determining device configured to determine whether or not game value has been inserted; and
a character image changing device configured to determine, when the insertion determining device determines that game value has been inserted, a contact part of the character image coordinated to a contact position and then display the character image changed based on the result of that determination on the image display device.

10. The gaming machine according to claim 9, wherein the character image changing device displays the character image changed based on a different performance pattern for each of the contact parts, on the image display device.

* * * * *